United States Patent
Lee et al.

(10) Patent No.: US 11,163,583 B2
(45) Date of Patent: Nov. 2, 2021

(54) ELECTRONIC DEVICE AND METHOD FOR TRANSCEIVING CONTROL SIGNAL

(71) Applicant: SAMSUNG ELECTRONICS CO., LTD., Suwon-si (KR)

(72) Inventors: Wookwang Lee, Suwon-si (KR); Guneet Singh Khurana, Suwon-si (KR); Dmitriy Moskvitin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 30 days.

(21) Appl. No.: 16/682,080

(22) Filed: Nov. 13, 2019

(65) Prior Publication Data
US 2020/0150976 A1 May 14, 2020

(30) Foreign Application Priority Data
Nov. 13, 2018 (KR) .......................... 10-2018-0139239

(51) Int. Cl.
*G06F 9/4401* (2018.01)
*G06F 1/26* (2006.01)
*H02J 7/34* (2006.01)

(52) U.S. Cl.
CPC ............ *G06F 9/4411* (2013.01); *G06F 1/266* (2013.01); *H02J 7/342* (2020.01)

(58) Field of Classification Search
CPC .................................................. G06F 9/4411
USPC ............................................................ 713/2
See application file for complete search history.

(56) References Cited

U.S. PATENT DOCUMENTS

| 9,946,317 | B2 * | 4/2018 | Backman | G06F 1/3287 |
| 10,866,628 | B2 * | 12/2020 | Waters | H03H 7/06 |
| 2010/0262392 | A1 | 10/2010 | Murphy et al. | |
| 2016/0216757 | A1 * | 7/2016 | Kim | G06F 1/3212 |
| 2016/0217103 | A1 * | 7/2016 | Kim | G06F 13/362 |
| 2016/0364360 | A1 * | 12/2016 | Lim | G06F 1/266 |
| 2017/0097666 | A1 | 4/2017 | Shin et al. | |
| 2017/0222459 | A1 * | 8/2017 | Kang | H01R 31/065 |
| 2017/0344508 | A1 * | 11/2017 | Setiawan | G06F 13/4282 |

(Continued)

FOREIGN PATENT DOCUMENTS

| EP | 3 141 974 | 3/2017 |
| KR | 10-0402473 | 10/2003 |

(Continued)

OTHER PUBLICATIONS

International Search Report and Written Opinion dated Feb. 27, 2020 in counterpart International Patent Application No. PCT/KR2019/015451.

(Continued)

*Primary Examiner* — Brian T Misiura
(74) *Attorney, Agent, or Firm* — Nixon & Vanderhye P.C.

(57) ABSTRACT

An electronic device according to various embodiments includes: a connector configured to be connected with an external electronic device; a memory configured to store instructions; and a processor configured to execute the stored instructions to control the electronic device to identify a control signal received through a channel initially activated based on the external electronic device being connected to the connector from among a plurality of channels, and to perform control based on a message included in the identified control signal.

16 Claims, 17 Drawing Sheets

(56) References Cited

U.S. PATENT DOCUMENTS

2018/0032350 A1    2/2018   Lee et al.
2018/0143927 A1    5/2018   Kim et al.

FOREIGN PATENT DOCUMENTS

| KR | 10-2011-0101092 | 9/2011 |
| KR | 10-1890872 | 9/2018 |
| KR | 10-2018-0108225 | 10/2018 |

OTHER PUBLICATIONS

Lightning (connector), https://en.wikipedia.org/wiki/Lighting_(connector), 5 pages.

* cited by examiner

ELECTRONIC DEVICE AND METHOD FOR TRANSCEIVING CONTROL SIGNAL

CROSS-REFERENCE TO RELATED APPLICATION

This application is based on and claims priority under 35 U.S.C. § 119 to Korean Patent Application No. 10-2018-0139239, filed on Nov. 13, 2018, in the Korean Intellectual Property Office, the disclosure of which is incorporated by reference herein in its entirety.

BACKGROUND

Field

The disclosure relates to an electronic device which transceives a control signal and an operating method thereof.

Description of Related Art

An electronic device may transceive a control signal with an external electronic device through an allocated channel. Such an electronic device may include a connector provided with data pins which are allocated a plurality of channels from the external electronic device.

An electronic device may receive a control signal from an external electronic device using a channel allocated through an enumeration operation from the external electronic device. Before the enumeration operation is completed in the external electronic device, the electronic device may not recognize data received through a plurality of data channels as its own data, and thus may not receive a control signal from the external electronic device.

The above information is presented as background information only to assist with an understanding of the disclosure. No determination has been made, and no assertion is made, as to whether any of the above might be applicable as prior art with regard to the disclosure.

SUMMARY

According to embodiments of the disclosure, an electronic device and an operating method thereof according to various embodiments can receive a control signal from an external electronic device even before an enumeration operation is completed.

The technical advantages achieved by the disclosure are not limited to those mentioned above, and other technical advantages that are not mentioned above may be clearly understood to those skilled in the art based on the description provided below.

An electronic device according to various example embodiments may include: a connector configured to be connected with an external electronic device; a memory configured to store instructions; and a processor configured to execute the stored instructions, the instructions, when executed by the processor, cause the processor to control the electronic device to: identify a control signal received through a channel that is initially activated after the external electronic device is connected to the connector from among a plurality of channels, and to perform control based on a message included in the identified control signal.

An electronic device according to various example embodiments may include: a connector configured to be electrically connected with an external electronic device; a communication module comprising communication circuitry configured to communicate with an external electronic device; a memory configured to store instructions; and a processor configured to execute the stored instructions. When an event is received from the another external electronic device, the processor may control the connector to supply power to the external electronic device, and, after the power is supplied to the external electronic device, may generate a control signal to be transmitted through a channel that is initially activated after the external electronic device is electrically connected to the connector from among a plurality of channels. The connector may be configured to transmit the generated control signal to the external electronic device, such that the external electronic device controls based on a message included in the generated control signal.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
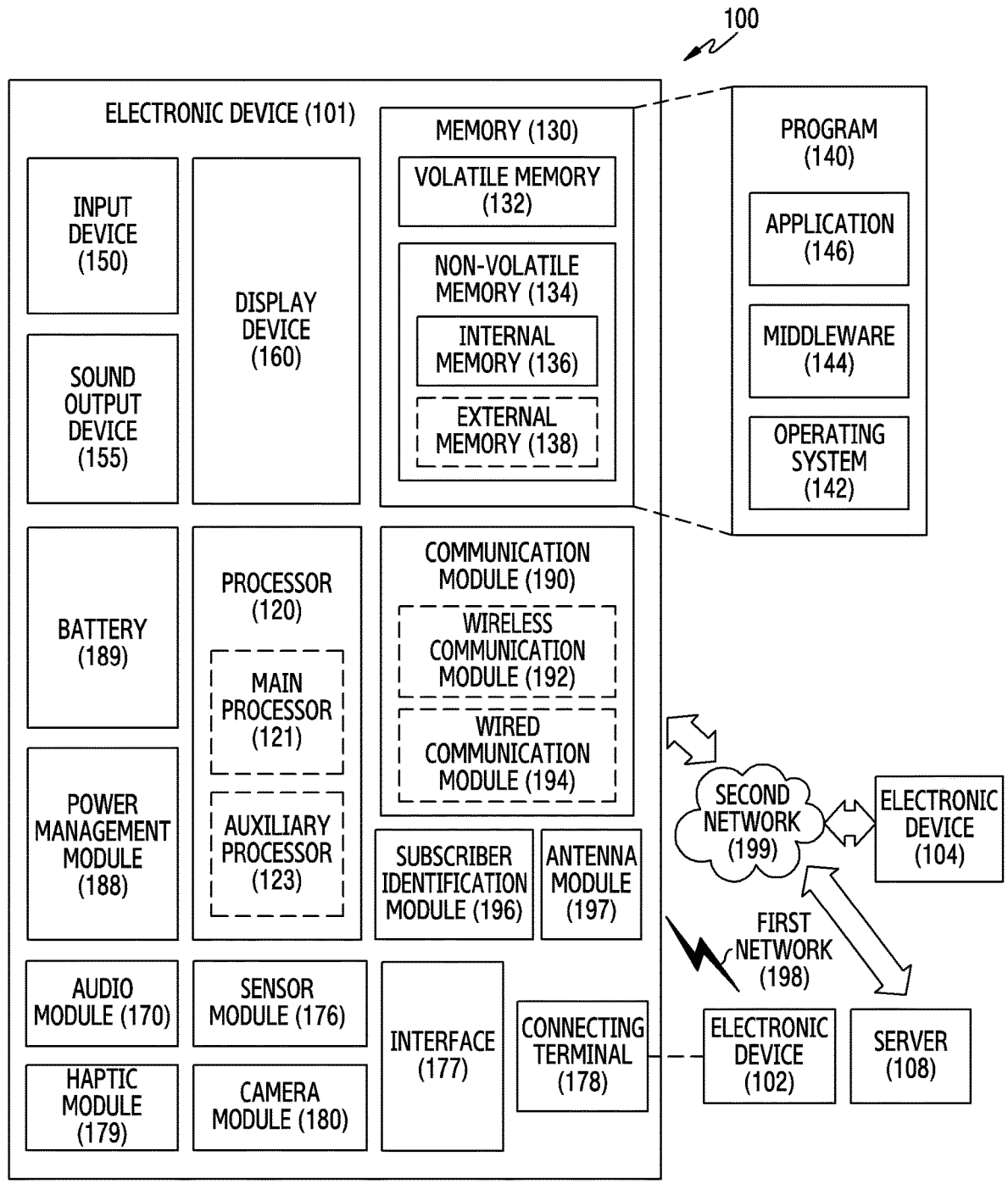
FIG. 1 is a block diagram illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, and without limitation, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements.

It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
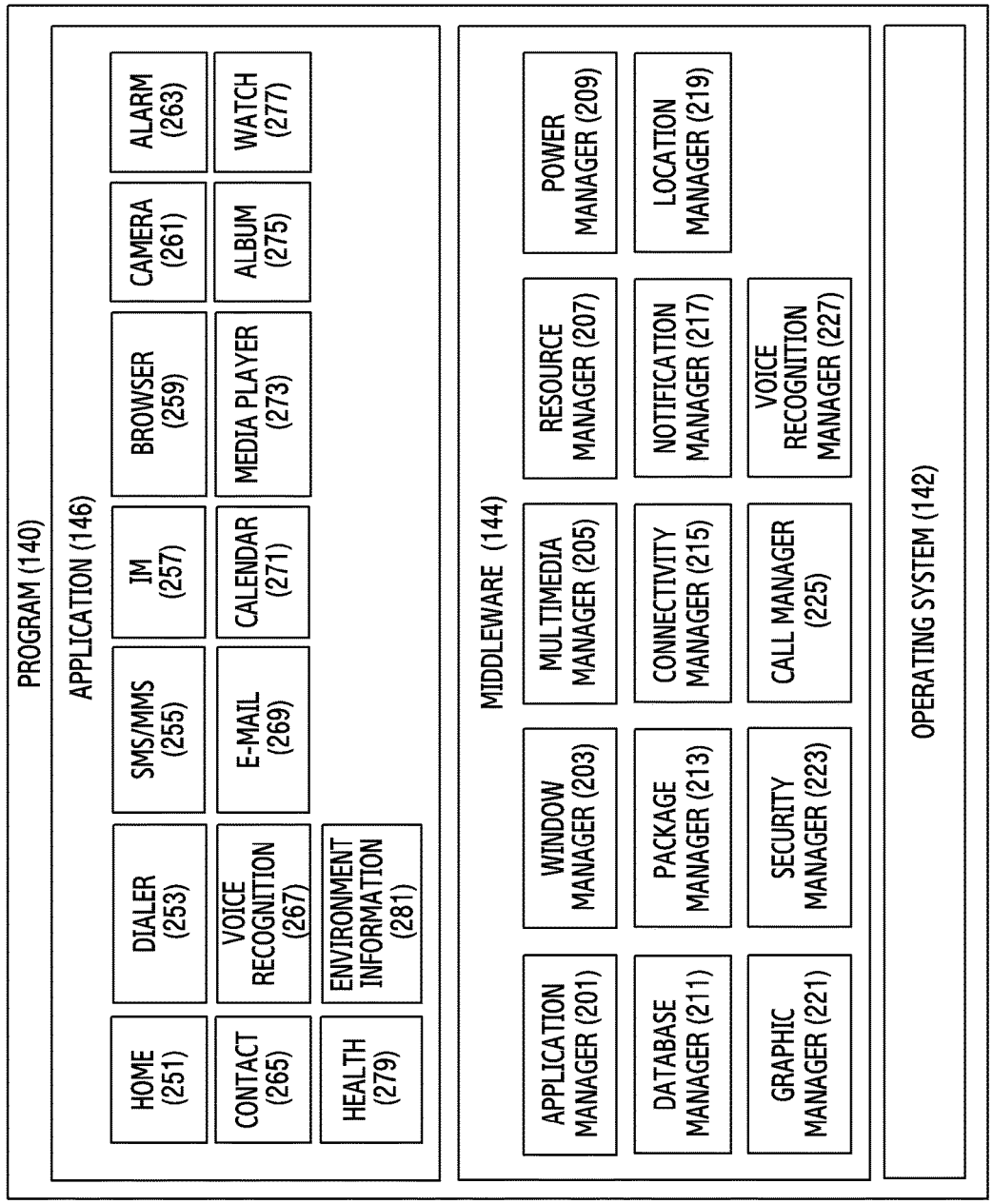
FIG. 2 is a diagram illustrating an example program of an electronic device according to various embodiments.

FIG. 2 is a block diagram 200 illustrating an example program 140 according to various embodiments. According to an embodiment, the program 140 may include an operating system (OS) 142 to control one or more resources of the electronic device 101, middleware 144, and/or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user. According to an embodiment, the program 140 may further include a bootloader (not shown) serving to drive the operating system 142 to boot the electronic device 101. According to an embodiment, the bootloader (not shown) may further include a command center rear (CCR) driver (for example, a CCR driver 431 of FIG. 4) to drive a universal serial bus (hereinafter, referred to as "USB") module (not shown) (or a USB controller).

The operating system 142 may control management (for example, allocation or collection) of one or more system resources (for example, a process, a memory, or power) of the electronic device 101. Additionally or alternatively, the operating system 142 may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197. According to an embodiment, the operating system 142 may further include a CCR driver (for example, the CCR driver 431 of FIG. 4) to drive a USB module (not shown) (or a USB controller). According to an embodiment, the operating system 142 may include at least one CCR driver. According to an embodiment, the at least one CCR driver (not shown) included in the operating system 142 may be different from the CCR driver (not shown) included in the bootloader (not shown). According to an embodiment, the CCR driver (not shown) included in the bootloader (not shown) may include instructions to process commands (for example, at least one of a reboot command (REBOOT CMD), or a start up command (START UP CMD), or a combination thereof) received from the external electronic device 102 through an initially activated channel. According to an embodiment, the CCR driver (not shown) included in the bootloader (not shown) may include instructions to shift the electronic device 101 from a power off state to a charging state, in which the operating system according to a low power mode is driven, when power is supplied from the external electronic device 102. According to an embodiment, at least one CCR driver (not shown) included in the operating system 142 may include instructions to process commands (for example, at least one of a start up command (START UP CMD), a shut down command (SHUT DOWN CMD), a wake up command (WAKE UP CMD), a sleep command (SLEEP CMD), a reboot command (REBOOT CMD), a CCR state transfer command (CCR STATE T/F CMD), a battery status transfer command (BATTERY STATUS T/F CMD), an application status transfer command (APP STATUS T/F CMD), or a combination thereof) received from the external electronic device 102 through an initially activated channel.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, a dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3A:
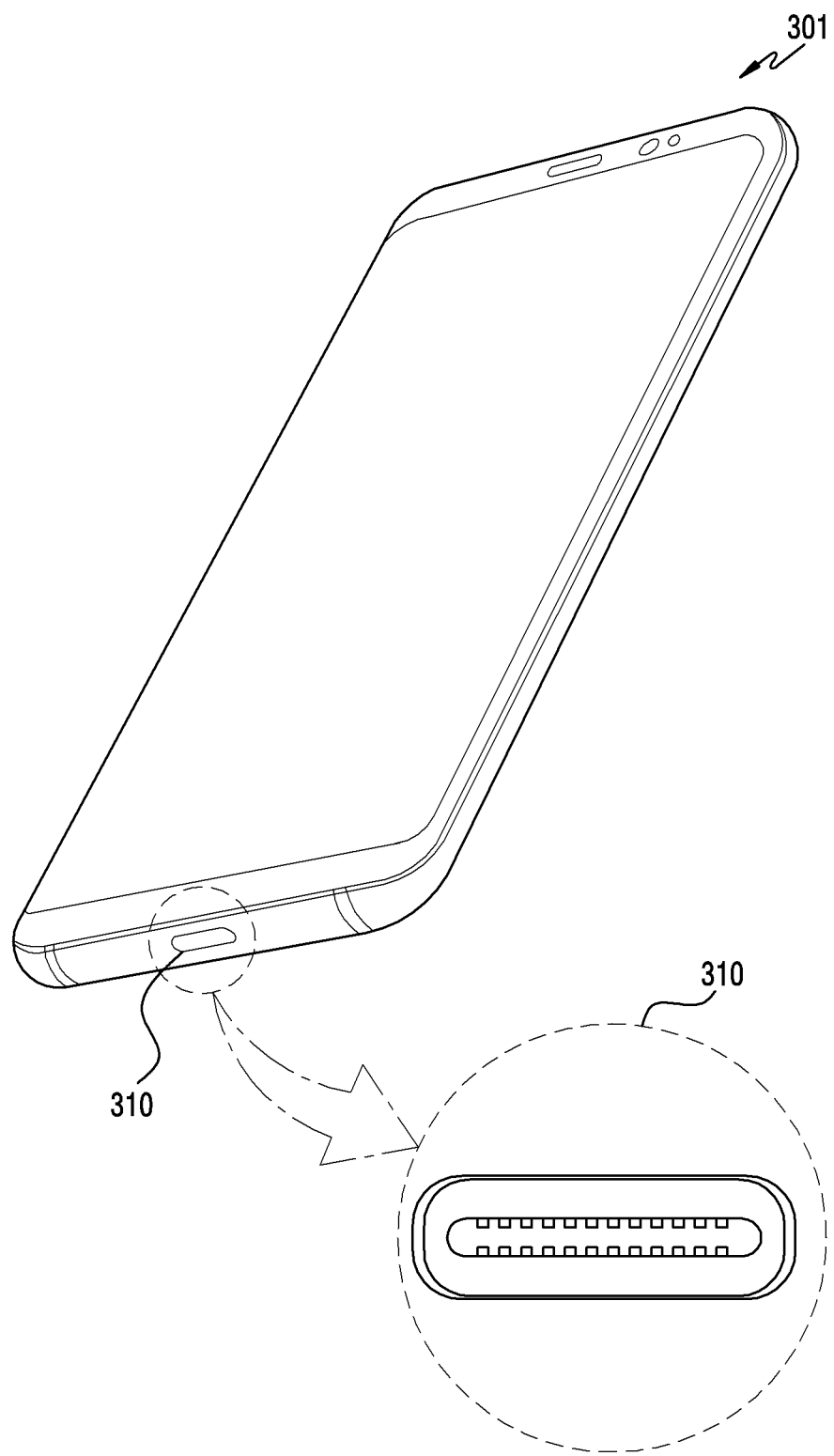
FIG. 3A is a diagram illustrating an example electronic device and a connector according to various embodiments.

FIG. 3A is a diagram illustrating an example electronic device 301 and a connector 310 according to various embodiments.

Figure 3B:
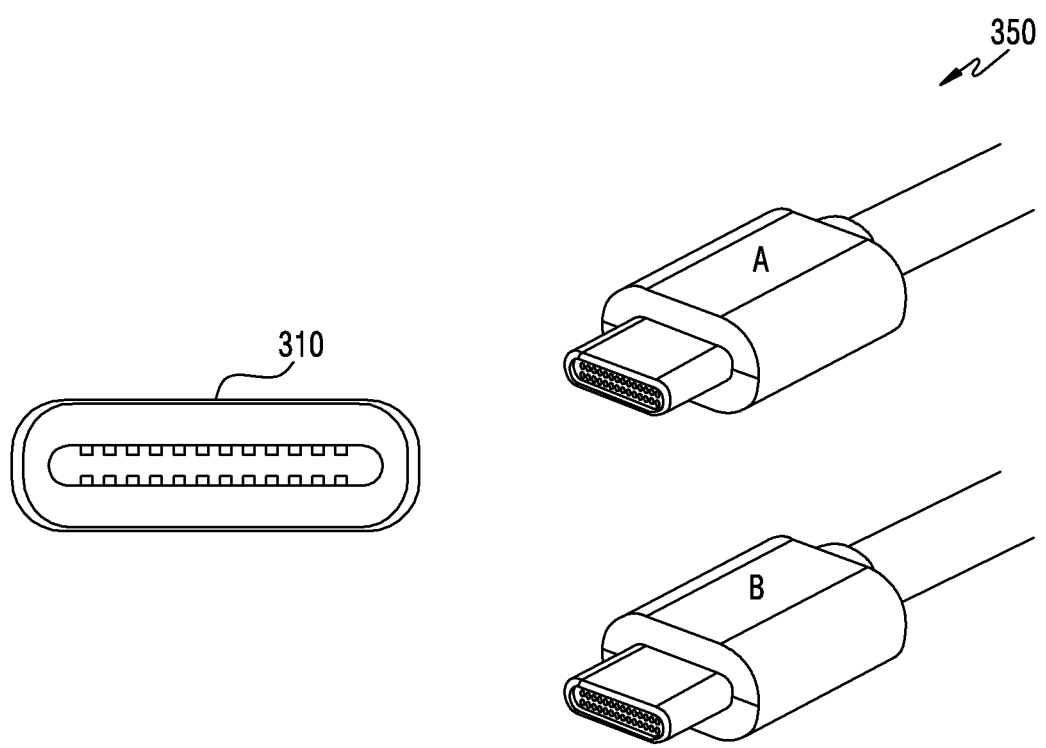
FIG. 3B is a diagram illustrating example connectors of an electronic device according to various embodiments.

FIG. 3B is a diagram illustrating example connectors 310, 350 of an electronic device according to various embodiments.

Figure 3C:
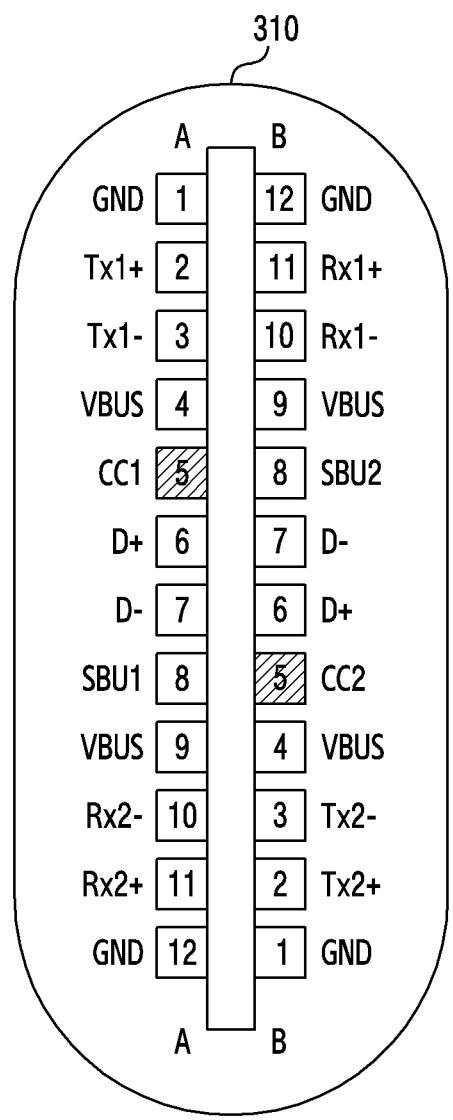
FIG. 3C is a diagram illustrating an example pin structure of the connector of the electronic device according to various embodiments.

FIG. 3C is a diagram illustrating an example pin structure of the connector 310 of the electronic device according to various embodiments.

Referring to FIG. 3A, in various embodiments, the electronic device 310 may include the connector 310 through which an external electronic device (for example, the external electronic device 102 shown in FIG. 1) is connected. In various embodiments, the electronic device 301 may be included in the electronic device 101 shown in FIG. 1. Although FIG. 3A depicts the electronic device 301 as a portable electronic device such as a smartphone, a tablet PC, the electronic device 301 is not limited hereto, and any electronic device that is provided with a connector to be connected with an external electronic device, and transceives data with the external electronic device connected through the connector can be interpreted as the electronic device 301 of FIG. 3A.

Referring to FIG. 3A, according to various embodiments, the electronic device 301 may include an opening formed on one surface of a housing and a hole connected with the opening, and may have the connector 310 disposed in the hole. As shown in FIG. 3A, an opening and a hole may be formed on one surface of a lower side of the housing of the electronic device 301, and the connector 310 may be disposed in the opening and the hole. However, the disposal position of the connector 310 is not limited hereto, and the connector 310 may, for example, be disposed on other surfaces of the housing of the electronic device 310.

According to various embodiments, a connector 350 of an external electronic device may be inserted into the connector 310 of the electronic device 301. There is no limit to types of external electronic devices, and all devices including a battery pack supplying power to the electronic device 301, a device communicating with the electronic device 301, or an external memory connected with the electronic device 301 may correspond to the external electronic device.

According to various embodiments, the connector 350 of the external electronic device may be received through the hole, and may physically contact the connector 310 of the electronic device 301 and may be electrically connected according to the physical contact. According to various embodiments, the connector 310 of the electronic device 301 and the hole structure may be reversible structures. For example, the connector 310 may be symmetrical with respect to a first direction which is perpendicular to a direction in which the external electronic device is inserted (for example, a direction from the bottom to the top of the electronic device 301), and a second direction which is opposite to the first direction.

Referring to FIG. 3B, the connector 350 of the external electronic device may be inserted into the connector 310 of the electronic device 301 with one surface (for example, the surface A) of the connector 350 being parallel to the front surface (for example, a surface on which the display is positioned) of the electronic device 301, or the connector 350 of the external electronic device may be inserted with the other surface (for example, the surface B) of the connector 350 being parallel to the front surface of the electronic device 301.

In various embodiments, the connector 310 may include a plurality of terminals, and, when the connector 350 of the external electronic device is inserted in a different direction, respective terminals of the external electronic device electrically connected to the terminals of the connector 310 of the electronic device 301 may be different.

According to various embodiments, the connector 310 may, for example, be a connector that follows a universal serial bus (USB) (hereinafter, referred to as "USB") standard, and for example, may be a connector of a USB type C standard. However, various embodiments of the disclosure are not limited to the USB type C, and are applicable to a connector following the USB-related standards such as, for example, and without limitation, a USB type B, a USB type A, wired interfaces of various standards such as, for example, and without limitation, a lightning port, a high definition multimedia interface (HDMI), recommended standard 232 (RS-232), power line communication, plain old telephone service (POTS), nonstandard wired interfaces, or the like. Various embodiments of the disclosure are applicable to any interface that can transmit data (for example, data which is transmitted from a CC1 pin or CC2 pin included in the type C standard) which is used to automatically detect what type of devices are connected between a source device (for example, a device providing power) and a sync device (for example, a device receiving power), or between a downstream facing port (DFP) (for example, a device providing data) and an upstream facing port (UFP) (for example, a device receiving data).

FIG. 3C is a diagram illustrating an example of a plurality of terminals provided in the connector 310 when the connector 310 of the electronic device (for example, the electronic device 301) follows the USB type C standard.

Referring to FIG. 3C, the connector 310 may include 12 terminals (or pins) in each of the line A on the left and the line B on the right, and may be symmetrical.

In various embodiments, data may be transmitted between the electronic device 301 and an external electronic device through data pins (or D+ pin and D− pin) positioned at the sixth place and the seventh place in the line A on the left of the connector 310, or data pins (or D+ pin and D− pin) positioned at the sixth place and the seventh place in the line B on the right. Power may be supplied to the electronic device 301 from an external electronic device through a power supply pin (or a VBUS pin) positioned at the fourth place of the line A on the left of the connector 310. Since roles of the terminals in various operation modes are defined according to the USB type C standard, the roles of the terminals will not be described.

In various embodiments, when the electronic device 310 and an external electronic device are connected with each other, electric signals (for example, a digital ID or a resistance ID) may be exchanged through a CC1 pin and a CC2 pin, and accordingly, the electronic device and the external electronic device may detect types of other devices connected thereto. In addition, the electronic device may operate in a downstream facing port (DFP) mode or an upstream facing port (UFP) mode according to a result of detecting a connected device. The DFP mode may refer to a mode in which data is provided, and the UFP mode may refer to a mode in which data is received.

Figure 4A:
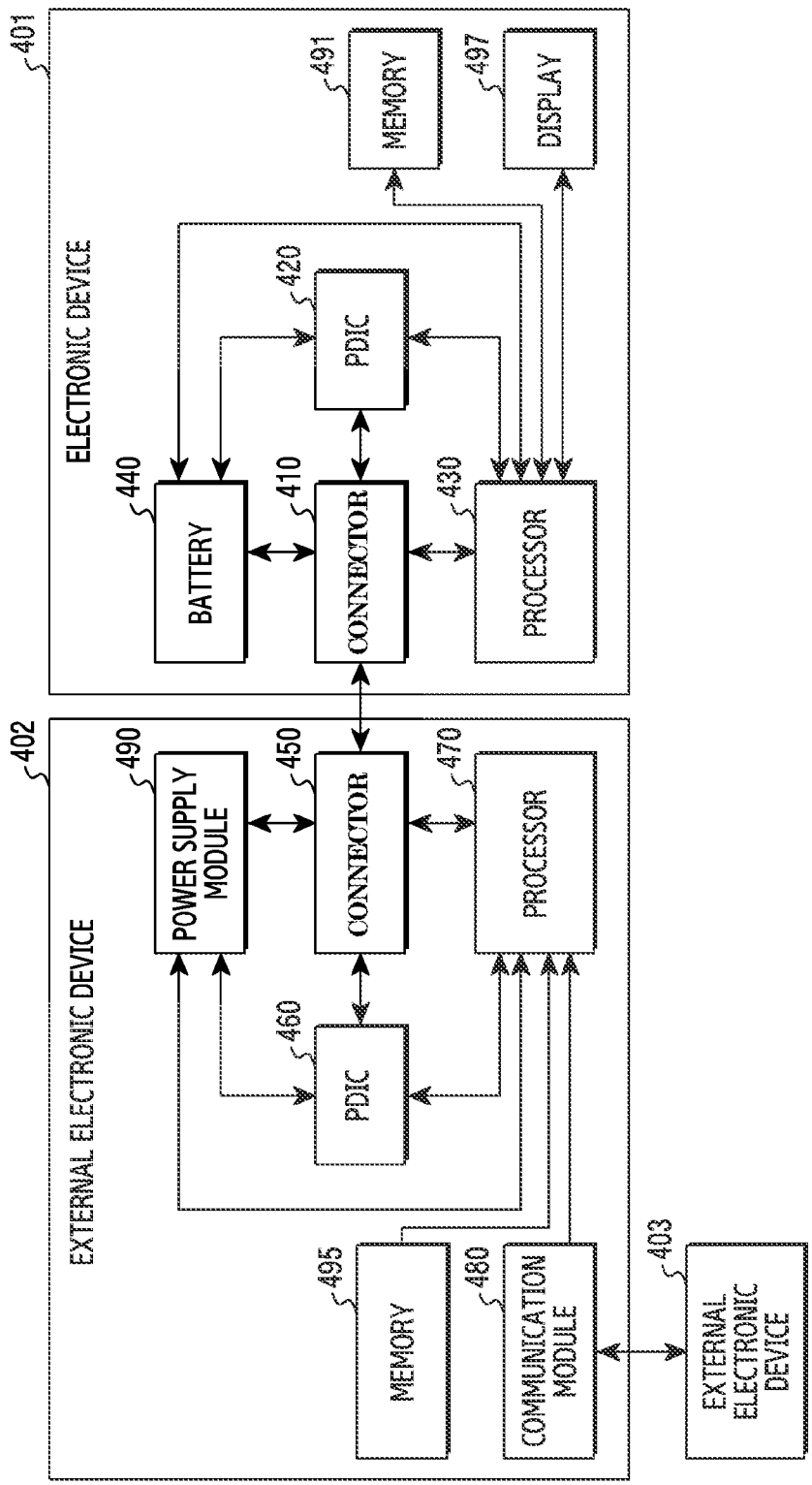
FIG. 4A is a block diagram illustrating an example electronic device and example external electronic device according to various embodiments.

FIG. 4A is a block diagram illustrating an example electronic device 401 and an example external electronic device 402 according to various embodiments.

According to various embodiments, the electronic device 401 may be the same as the electronic device 101 shown in FIG. 1, the electronic device 202 shown in FIG. 2, or the electronic device 301 shown in FIG. 3 at least in part.

Referring to FIG. 4A, in various embodiments, the electronic device 401 may include at least one of a connector 410, a power delivery integrated circuit (PDIC) 420 (hereinafter, referred to as "PDIC"), a processor (e.g., including processing circuitry) 430, a battery 440, a memory 491, and a display 497, or any combination thereof. In various embodiments, some elements may be omitted. In various embodiments, the electronic device 401 may be referred to as a command center rear (CCR) (hereinafter, referred to as "CCR"). In various embodiments, the battery 440 may be included in the battery 189 shown in FIG. 1. In various embodiments, the memory 491 may be included in the memory 130 shown in FIG. 1. In various embodiments, the display 497 may be included in the display device 160 shown in FIG. 1. In various embodiments, the electronic device 401 may further include a controller (not shown). In various embodiments, the controller (not shown) (for example, a USB controller) may be connected between the connector 410 and the processor 430.

In various embodiments, the connector 410 may be included in the connection terminal 178 shown in FIG. 1, or the connector 310 shown in FIGS. 3A, 3B, and 3C, but the disclosure is not limited thereto. In various embodiments, the connector 410 may include various types of pins (for example, pins of the connector 310 shown in FIG. 3C). In various embodiments, the connector 410 may be electrically connected with a connector 450 of an external electronic device 402 through various types of pins. In various embodiments, the connector 410 may receive power from the connector 450 of the external electronic device 402 through a power supply pin (for example, the VBUS pin of the connector 310 shown in FIG. 3C). In various embodiments, the connector 410 may deliver data transmission speed information of the electronic device 401 to the connector 450 of the external electronic device 402 through data pins (for example, at least one of the D+ pin, the D− pin of the connector 310 shown in FIG. 3C, or a combination thereof). In various embodiments, the connector 410 may transmit data to the connector 450 of the external electronic device 402 or may receive data from the connector 450 of the external electronic device 402 through the data pins.

In various embodiments, the PDIC 420 may be electrically connected with the connector 410. In various embodiments, the PDIC 420 may, for example, be a power delivery circuit of the USB type C standard. In various embodiments, the PDIC 420 may include at least one of a configuration channel (CC) (hereinafter, referred to as "CC") logic (not shown), a power delivery (PD) (hereinafter, referred to as "PD") logic (not shown), or a combination thereof. In various embodiments, the PDIC 420 may transceive a PD message with the external electronic device 402 electrically connected through a CC pin of the connector 410 (for example, at least one of the CC1 pin, the CC2 pin of the connector 310 shown in FIG. 3C, or a combination thereof). In various embodiments, the PDIC 420 may be electrically connected with the processor 430. In various embodiments, the PDIC 420 may deliver the PD message received from the external electronic device 420 to the processor 430. In various embodiments, the PD message may include at least one of data regarding the number of data objects, a power role of the electronic device (for example, information regarding whether power is supplied to the external electronic device or received from the external electronic device), a version of a PD specification of the electronic device, and a data role of the electronic device 410 (for example, information regarding whether data is transmitted to the external electronic device or received from the external electronic device).

In various embodiments, the processor 430 may be included in the processor 120 shown in FIG. 1. In various embodiments, the processor 430 may include various processing circuitry and identify a connection with the external electronic device 402 based on at least one of a voltage applied to the power supply pin (for example, the VBUS pin shown in FIG. 3C) of the connector 410, a voltage applied to the data pins (for example, the D+ pin or D− pin shown in FIG. 3C), or a combination thereof.

In various embodiments, when the electronic device 401 is connected with the external electronic device 402, the processor 430 may receive a command from the external electronic device 410 through an initially activated channel. In various embodiments, the processor 430 may control the electronic device 401 to transmit a response to the command received through the initially activated channel to the external electronic device 402 through the initially activated channel. In various embodiments, the initially activated channel may be a communication channel between the electronic device 401 and the external electronic device 402 for at least one of US enumeration, USB configuration, or a combination thereof among a plurality of channels. In various embodiments, data transceived through the initially activated channel may be data that has a set end point address among data transceived through the data pins of the connector 410. In various embodiments, data transceived through the initially activated channel may be data indicating an end point 0. For example, the initially activated channel may have an end point of 0. However, this should not be considered as limiting.

In various embodiments, when the electronic device 401 is connected with the external electronic device 402, the processor 430 may receive a descriptor transmission command from the external electronic device 402 through the initially activated channel. In various embodiments, the processor 430 may receive the descriptor transmission command from the external electronic device 402 through the initially activated channel before driving an operating system (for example, the operating system 142 shown in FIG. 2). In various embodiments, in response to the descriptor transmission command, the processor 430 may load a descriptor stored in the memory 491 through a CCR driver (for example, a CCR driver 431 shown in FIG. 4B) included in a bootloader (not shown). In various embodiments, in response to the descriptor transmission command, the processor 430 may transmit the loaded descriptor to the external electronic device 402 through the initially activated channel. In various embodiments, the descriptor may include at least one of classification information of the electronic device 401, USB specification information, size information of data transceivable through the initially activated channel, required power information, or a combination thereof.

In various embodiments, the processor 430 may receive a channel configuration command generated by the external electronic device 402 based on the descriptor from the external electronic device 402 through the initially activated channel before driving the operating system (for example, the operating system 142 shown in FIG. 2). In various embodiments, the processor 430 may receive a command from the external electronic device 401 through at least one of the initially activated channel, a channel allocated according to the channel configuration command, or a combination thereof, and may transmit a response to the command to the external electronic device 402. In various embodiments, the processor 430 may exchange data with the external electronic device 402 through the initially activated channel even after a channel is allocated according to the channel configuration command. In various embodiments, the processor 430 may exchange data with the external electronic device 402 through the initially activated channel even after the operating system (for example, the operating system 142 shown in FIG. 2) is driven.

In various embodiments, the processor 430 may receive a control command from the external electronic device 402 through the initially activated channel. In various embodiments, the processor 430 may execute instructions stored in the memory 491 based on the control command. In various embodiments, the processor 430 may transmit a response to the control command to the external electronic device 402 through the initially activated channel. In various embodiments, the control command may include at least one of a start up command (START UP CMD), a shut down command (SHUT DOWN CMD), a wake up command (WAKE UP CMD), a sleep command (SLEEP CMD), a reboot command (REBOOT CMD), a CCR state transfer command (CCR STATE T/F CMD), a battery status transfer command (BATTERY STATUS T/F CMD), an application status transfer command (APP STATUS T/F CMD), or a combination thereof. Various embodiments of an operation regarding the control command will be described below.

Referring to FIG. 4A, in various embodiments, the external electronic device 402 may include at least one of the connector 450, a PDIC 460, a processor (e.g., including processing circuitry) 470, a communication module (e.g., including communication circuitry) 480, a power supply module (e.g., including power supply circuitry) 490, and a memory 495, or any combination thereof. In various embodiments, some elements may be omitted. In various embodiments, the external electronic device 402 may be included in the external electronic device 102 shown in FIG. 1. In various embodiments, the external electronic device 402 may be referred to as a command center rear adaptor (CCR AD) (hereinafter, referred to as "CCR AD"). In various embodiments, the memory 491 may be included in the memory 130 shown in FIG. 1. In various embodiments, the external electronic device 402 may further include a controller (not shown). In various embodiments, the controller (not shown) may be connected between the connector 450 and the processor 470.

In various embodiments, the connector 450 may be an element corresponding to the connector 410 of the electronic device 401. For example, when the connector 410 of the electronic device 401 is a female type connector, the connector 450 may be a male type connector. In various embodiments, the connector 450 may be included in the connector 350 shown in FIG. 3B. In various embodiments, the connector 450 may include various types of pins (for example, pins of the connector 310 shown in FIG. 3C) corresponding to the connector 410.

In various embodiments, the PDIC 460 may be an element corresponding to the PDIC 420 of the electronic device 401. In various embodiments, the PDIC 460 may be electrically connected with the connector 450. In various embodiments, the PDIC 460 may include at least one of a CC logic, a PD logic, or a combination thereof. In various embodiments, the PDIC 460 may transceive a PD message with the electronic device 401 electrically connected through a CC pin of the connector 450. In various embodiments, the PDIC 460 may be electrically connected with the processor 470. In various embodiments, the PDIC 460 may deliver the PD message received from the electronic device 401 to the processor 470.

In various embodiments, the processor 470 may be included in the processor 120 shown in FIG. 1. In various embodiments, the processor 470 may include various processing circuitry and generate a control message for the electronic device 401 in response to an event notification of an external electronic device 403 received through the communication module 480. In various embodiments, the processor 470 may generate a control message for the electronic device 401 in response to an event notification which occurs by a user pushing an input button (not shown) (for example, a power key). In various embodiments, the input button (not shown) may be a physical button protruding to the outside through the housing (not shown) of the external electronic device 402. In various embodiments, the processor 470 may generate a control message for the electronic device 401 based on a set condition (for example, a set time interval). In various embodiments, the processor 470 may transmit the control message to the electronic device 401 through an initially activated communication channel.

In various embodiments, the power supply module 490 may be electrically connected with the connector 450. In various embodiments, the power supply module 490 may include various power supply circuitry and apply a set voltage (for example, 5V) to a power supply pin of the connector 450. In various embodiments, when the connector 410 of the electronic device 401 is connected to the connector 450, the power supply module 490 may supply power to the electronic device 401 by applying a set current (for example, 1A) to the power supply pin of the connector 450. In various embodiments, the power supply module 490 may receive power from at least one of another external electronic device (for example, a battery of a car), a battery (not shown) embedded in the external electronic device, or a combination thereof. In various embodiments, the power supply module 490 may be included in the power management module 188 shown in FIG. 1.

The communication module 480 may include various communication circuitry and communicate with the external electronic device 403. In various embodiments, the communication module 480 may receive at least one of an event notification of the external electronic device 403, an event notification of a car in which the external electronic device 403 is mounted, or a combination thereof from the external electronic device 403. In various embodiments, the communication module 480 may transmit the received event notification to the processor 470. In various embodiments, the communication module 480 may receive, from the processor 470, a command of the electronic device 401 received by the processor 470 through the connector 450 (for example, a car window open command, a car window close command, an indoor lamp turn on command, an indoor lamp turn off command, a volume control command). In various embodiments, the communication module 480 may transmit the received command of the electronic device 401 to the external electronic device 403. In various embodiments, the communication module 480 may communicate with the external electronic device 403 through a controller area network (CAN) (hereinafter, referred to as "CAN"). However, this should not be considered as limiting. In various embodiments, the communication module 480 may be included in the communication module 190 shown in FIG. 1.

Referring to FIG. 4A, the external electronic device 403 may communicate with the external electronic device 402. In various embodiments, the external electronic device 403 may, for example, be configured as a head unit of a car. In various embodiments, the external electronic device 403 may be an electronic device which is mounted in a car.

Figure 4B:
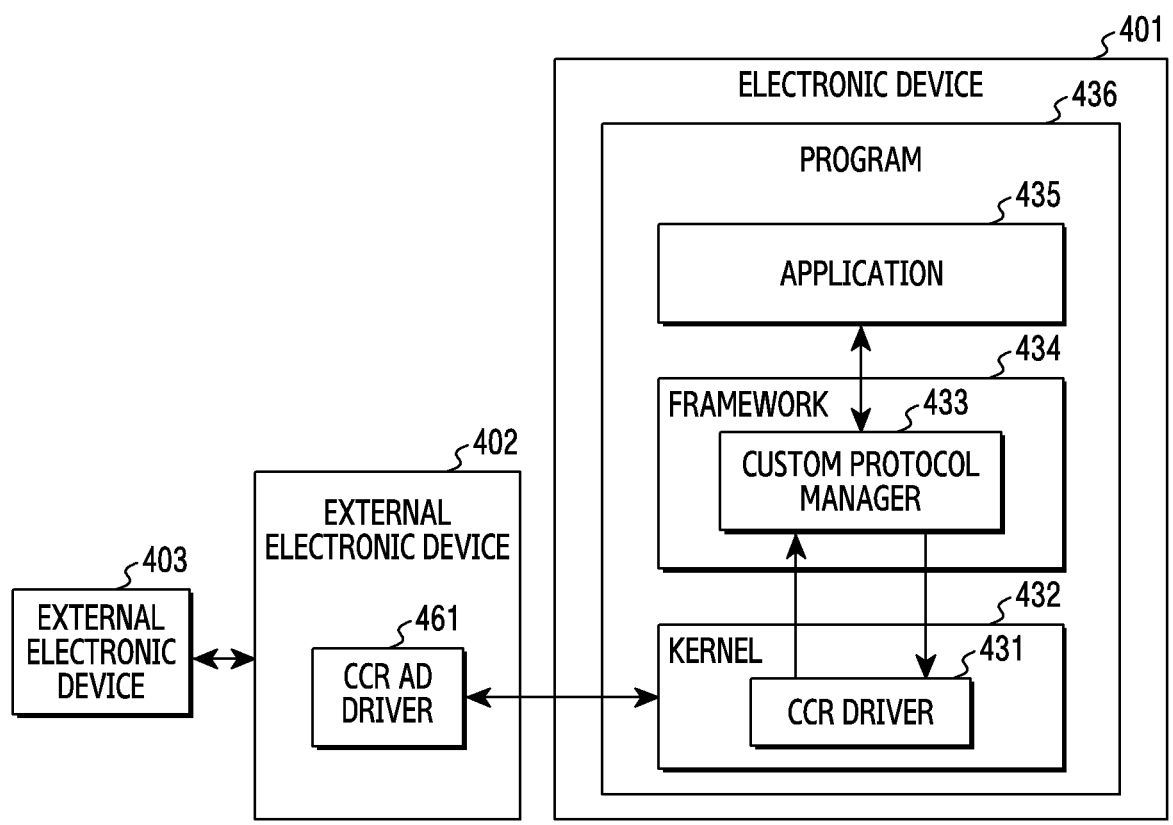
FIG. 4B is a block diagram illustrating an example of functional configurations of an electronic device and external electronic devices according to various embodiments.

FIG. 4B is a diagram illustrating an example of functional configurations of an electronic device 401 and external electronic devices 402, 403 according to various embodiments.

Referring to FIG. 4B, in various embodiments, the external electronic device 402 may communicate with the external electronic device 403 through a communication module (for example, the communication module 480 of FIG. 4A). In various embodiments, a processor (for example, the processor 470 of FIG. 4A) of the external electronic device 402 may include various processing circuitry and drive a CCR AD driver 461 corresponding to a descriptor received from the electronic device 401 among a plurality of drivers stored in a memory (for example, the memory 495 of FIG. 4A). In various embodiments, the processor of the external electronic device 402 may transmit a command to the electronic device 401 through the CCR AD driver 461.

Referring to FIG. 4B, in various embodiments, a processor of the electronic device 401 (for example, the processor 430 of FIG. 4A) may include various processing circuitry and drive a CCR driver 431 stored in a memory (for example, the memory 491 of FIG. 4A). In various embodiments, the processor of the electronic device 401 may generate an event regarding a command received from the external electronic device 402 through the CCR driver 431 of a kernel 432, and may deliver the event to a custom protocol manager 433 of a framework 434. In various embodiments, the event may be a message to be delivered to the framework 434 from the kernel 432 in which the the CCR driver 431 is driven. In various embodiments, the kernel 432, the framework 434, and an application 435 may be included in a program 436. In various embodiments, the kernel 432 may be included in the operating system 142 of FIG. 2, the framework 434 may be included in the middleware 144 of FIG. 2, the application 435 may be included in the application of FIG. 2, and the program 436 may be included in the program 140 of FIG. 2, but this should not be considered as limiting.

Referring to FIG. 4B, in various embodiments, the custom protocol manager 433 of the framework of the processor of the electronic device 401 may deliver a message corresponding to the event to the application 435 of the event. In various embodiments, the custom protocol manager 433 of the framework may deliver a response message to the event to the CCR driver 431 through a virtual file system (for example, Sysfs) node. In various embodiments, the virtual file system (for example, Sysfs) node may be a pseudo file system for providing an interface for the kernel 432. In various embodiments, the Sysfs node may be a pseudo file system provided from a Linux kernel.

Referring to FIG. 4B, in various embodiments, the processor of the electronic device 401 may deliver the response message to the event to the external electronic device 402 through the CCR driver.

Figure 5:
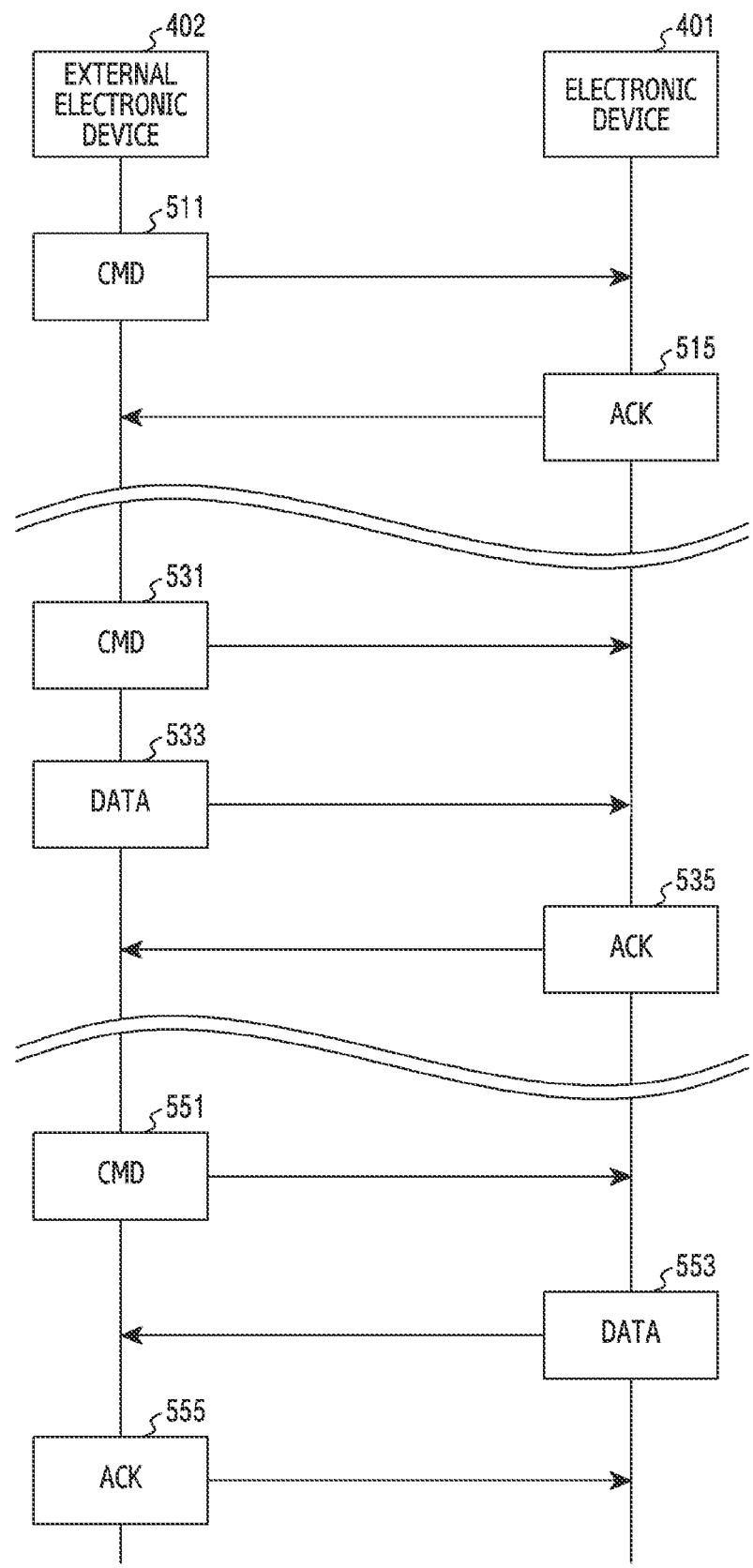
FIG. 5 is a diagram illustrating an example data transceiving process between an electronic device and an external electronic device according to various embodiments.

FIG. 5 is diagram illustrating an example data transceiving process between the electronic device 401 and the external electronic device 402 according to various embodiments.

Referring to FIG. 5, in operation 511, the processor 470 of the external electronic device 402 according to various embodiments may transmit a command (CMD) (hereinafter, referred to as "CMD") to the electronic device 401. In operation 515, the processor 430 of the electronic device 401 may transmit acknowledgement (ACK) (hereinafter, referred to as "ACK") to the external electronic device 402, based on the CMD received from the external electronic device 402.

Referring to FIG. 5, in operation 531, the processor 470 of the external electronic device 402 according to various embodiments may transmit a CMD to the electronic device 401. In operation 533, the processor 470 of the external electronic device 402 may transmit data (DATA) (hereinafter, referred to as "DATA") to the electronic device 401 based on the CMD. In operation 535, the processor 430 of the electronic device 401 may transmit ACK to the external electronic device 402, based on the CMD and the data received from the external electronic device 402.

Referring to FIG. 5, in operation 551, the processor 470 of the external electronic device 402 according to various embodiments may transmit a CMD to the electronic device 401. In operation 553, the processor 430 of the electronic device 401 may transmit data to the external electronic device 402 based on the CMD. In operation 555, the processor 470 of the external electronic device 402 may transmit ACK to the electronic device 401 based on the data received from the electronic device 401.

In various embodiments, the CMD transmitted in operation 511, 531, 551 may be data of a structure as shown, for example, in table 1 presented below:

TABLE 1

| bmRequest Type | bRequest | wValue | wIndex | wLength |
| --- | --- | --- | --- | --- |

As shown in table 1, the CMD may include a bmReqeust Type field, a bRequest field, a wValue field, a wIndex field, and a wLength field. In various embodiments, the bmReqeust Type, bRequest, wValue, wIndex, and wLength fields may, for example, be fields which are defined in a setup packet format according to the USB standard.

In table 1, the bmRequest Type field may be 1 byte long. In various embodiments, an entity of the bmRequest Type field may have a value of 0xC0 or 0x40. In various embodiments, when the entity of the bmRequest Type field is 0xC0, the CMD may indicate that a request direction is from the electronic device 401 to the external electronic device 402, a request type is a vendor type, a recipient is a device (for example, when the external electronic device 402 is a host, the device may be the electronic device 401). In various embodiments, when the entity of the bmRequest Type field is 0x40, the CMD may indicate that a request direction is from the external electronic device 402 to the electronic device 401, a request type is a vendor type, and a recipient is a device (for example, when the external electronic device 402 is a host, the device may be the electronic device 401).

In table 1, the bRequest field may be 1 byte long. In various embodiments, an entity of the bRequest field may have a value of 0xF1. In various embodiments, when the entity of the bRequest field is 0xF1, the CMD may indicate a command which is newly defined to be distinct from standard device request codes according to the USB standard.

In table 1, the wValue field may be 2 bytes long. In various embodiments, an entity of the wValue field may have various values. In various embodiments, based on values of the entity of the wValue field, the CMD may indicate various message types. In various embodiments, various message types distinct from one another by values of the entity of the wValue field may be as shown, for example, in table 2 presented below:

TABLE 2

| wValue | Message Types | Data Phase | Data |
| --- | --- | --- | --- |
| 0x0063 | START UP | N | — |
| 0x0064 | SHUTDOWN | N | — |
| 0x0065 | REBOOT | N | — |
| 0x0066 | STEEP | N | — |
| 0x0067 | WAKEUP | N | — |
| 0x0068 | TOGGLE LOCK/UNLOCK | N | — |
| 0x0069 | CCR STATE REQUEST | N | — |
| 0x0070 | CCR STATE TRANSFER | Y | CCR |
| 0x0096 | BATTERY STATUS REQUEST | N | — |
| 0x0097 | BATTERY STATUS TRANSFER | Y | CCR |
| 0x0098 | APP ACTIVITY STATUS REQUEST | N | — |
| 0x0099 | APP ACTIVITY STATUS TRANSFER | Y | CCR |

In table 2, a CMD having the message type of START UP may be a CMD to boot the operating system (for example, the operating system 142 shown in FIG. 2) of the electronic device 401. In various embodiments, a CMD having the message type of SHUT DOWN may be a CMD to shut down the operating system (for example, the operating system 142 shown in FIG. 2) of the electronic device 401. In various embodiments, a CMD having the message type of REBOOT may be a CMD to reboot the operating system (for example, the operating system 142 shown in FIG. 2) of the electronic device 401. In various embodiments, a CMD having the message type of SLEEP may be a CMD to turn off the display 497. In various embodiments, a CMD having the message type of WAKE UP may be a CMD to turn on the display 497. In various embodiments, a CMD of the message type of TOGGLE LOCK/UNLOCK may be a CMD to change ON-OFF states of the display 497. In various embodiments, a CMD having the message type of CCR STATE REQUEST may be a CMD to request a current state of the electronic device 401. In various embodiments, a CMD having the message type of CCR STATE TRANSFER may be a CMD to request a current state of the electronic device 401. In various embodiments, a CMD having the message type of BATTERY STATUS REQUEST may be a CMD to request a current status of the battery 491. In various embodiments, a CMD having the message type of BATTERY STATUS TRANSFER may be a CMD to request a current status of the battery 491. In various embodiments, a CMD having the message type of APP ACTIVITY STATUS REQUEST may be a CMD to request a current status of the application 435. In various embodiments, a CMD having the message type of APP ACTIVITY STATUS TRANSFER may be a CMD to request a current status of the application 435.

When the entity of the wValue field is 0x0063, the message type of the CMD may be START UP and the data phase may be omitted as shown in table 2. In various embodiments, when the entity of the wValue field is 0x0065, the message type of the CMD may be REBOOT and the data phase may be omitted. In various embodiments, when the entity of the wValue field is 0x0066, the message type of the CMD may be SLEEP and the data phase may be omitted. In various embodiments, when the entity of the wValue field is 0x0067, the message type of the CMD may be WAKE UP and the data phase may be omitted. In various embodiments, when the entity of the wValue field is 0x0068, the message type of the CMD may be TOGGLE LOCK/UNLOCK and the data phase may be omitted. In various embodiments, when the entity of the wValue field is 0x0069, the message type of the CMB may be CCR STATE REQUEST and the data phase may be omitted. In various embodiments, when the entity of the wValue field is 0x0070, the message type of the CMD may be CCR STATE TRANSFER, the data phase may not be omitted, and data in the data phase may be transmitted from a CCR (for example, the electronic device 401). In various embodiments, when the entity of the wValue field is 0x0096, the message type of the CMD may be BATTERY STATUS REQUEST and the data phase may be omitted. In various embodiments, when the entity of the wValue field is 0x0097, the message type of the CMD may be BATTERY STATUS TRANSFER, the data phase may not be omitted, and data in the data phase may be transmitted from the CCR (for example, the electronic device 401). In various embodiments, when the entity of the wValue field is 0x0098, the message type of the CMD may be APP ACTIVITY STATUS REQUEST and the data phase may be omitted. In various embodiments, when the entity of the wValue field is 0x0099, the message type of the CMD may be APP ACTIVITY STATUS TRANSFER, the data phase may not be omitted, and data in the data phase may be transmitted from the CCR (for example, the electronic device 401). In various embodiments, the data phase may indicate a time period during which data is transmitted after a CMD is transmitted and before ACK is transmitted. For example, when the data phase is omitted, the external electronic device 402 may transmit a CMD, and then, at the next message transceiving time, the electronic device 401 may transmit ACK. In another example, when the data phase is not omitted, the external electronic device 402 may transmit a CMD, and then, at the next message transceiving time, data may be transmitted from the external electronic device 402 or the electronic device 401, and then, at the next message transceiving time, ACK may be transmitted from the electronic device 401 or the external electronic device 402. Operations between the external electronic device 402 and the electronic device according to message types according to various embodiments will be described below.

In various embodiments, when the message type of a CMD is START UP, SHUT DOWN, REBOOT, SLEEP, WAKE UP, TOGGLE LOCK/UNLOCK, CCR STATE REQUEST, BATTERY STATUS REQUEST, or APP ACTIVITY STATUS REQUEST, the entity of the bmRequest Type field may be 0x40. In various embodiments, when the message type of a CMD is CCR STATE TRANSFER, BATTERY STATUS TRANSFER, or APP ACTIVITY STATUS TRANSFER, the entity of the bmRequest Type field may be 0xC0.

Referring back to table 1, the wIndex field may be 2 bytes long. In various embodiments, an entity of the wIndex field may have various values. In various embodiments, based on a value of the entity of the wIndex field, the CMD may indicate a shut down time of the electronic device 401.

In table 1, the wLength field may be 2 bytes long. In various embodiments, an entity of the wLength field may have various values. In various embodiments, based on a value of the entity of the wLength field, the CMD may indicate a length of data in a data phase.

In various embodiments, when a CMD transmitted to the electronic device 401 by the external electronic device 402 is a CMD indicating that a data phase is omitted, the electronic device 401 may transmit ACK to the CMD to the external electronic device 402. In various embodiments, when a CMD transmitted to the electronic device 401 by the external electronic device 402 is a CMD indicating that a data phase is not omitted and data according to the data phase is transmitted by the external electronic device 402, the external electronic device 402 may transmit the CMD and then transmit data to the electronic device 401, and the electronic device 401 may transmit ACK to the data to the external electronic device 402. In various embodiments, when a CMD transmitted to the electronic device 401 by the external electronic device 402 is a CMD indicating that a data phase is not omitted, and data according to the data phase is transmitted by the electronic device 401, and the external electronic device 402 transmits the CMD, the electronic device 401 may transmit data to the external electronic device 402 based on the CMD, and the external electronic device 402 may transmit ACK to the data to the electronic device 401. For example, based on a CMD transmitted to the electronic device 401 by the external electronic device 402, processes of operations 511 and 515 may be performed, processes of operations 531, 533, and 535 may be performed, or processes of operations 551, 553, and 555 may be performed. Hereinbelow, at least one of data according to a CMD, ACK, or a combination thereof will not be described for the sake of brevity of explanation. However, when it is illustrated that a CMD is transmitted, at least one of the data according to the transmitted CMD, ACK, or a combination thereof may be transmitted.

In various embodiments, it may be determined whether data is transmitted, based on a value of the entity of the wValue field. For example, when the value of the entity of the wValue field of the CMD is a value corresponding to the message type indicating START UP, transmission of data may be omitted. In another example, when the value of the entity of the wValue field of the CMD is a value corresponding to the message type indicating CCR STATE TRANSFER, data may be transmitted. In various embodiments, a transmission entity of data may be determined based on a value of the entity of the bmRequest Type field. For example, when the value of the entity of the bmRequest Type field of the CMD is 0x40, the transmission entity of data may be the external electronic device 402. In another example, when the value of the entity of the bmRequest Type field of the CMD is 0xC0, the transmission entity of data may be the electronic device 401. In various embodiments, a length of data may be determined based on a value of the entity of the wLength field of the CMD. For example, when the value of the entity of the wLength field is 2, the length of data may be 2 bytes. In another example, when the value of the entity of the wLength field is 1, the length of data may be 1 byte.

FIGS. 6A, 6B, 6C, 6D, 6E, and 6F illustrate various example data transceiving processes between the electronic device 401 and the external electronic device 402 according to various embodiments. FIGS. 6A, 6B, 6C, 6D, 6E, and 6F will be described with reference to the configurations of the electronic device 401, the external electronic device 402, and the external electronic device 403 shown, for example, in FIG. 4A.

Figure 6A:
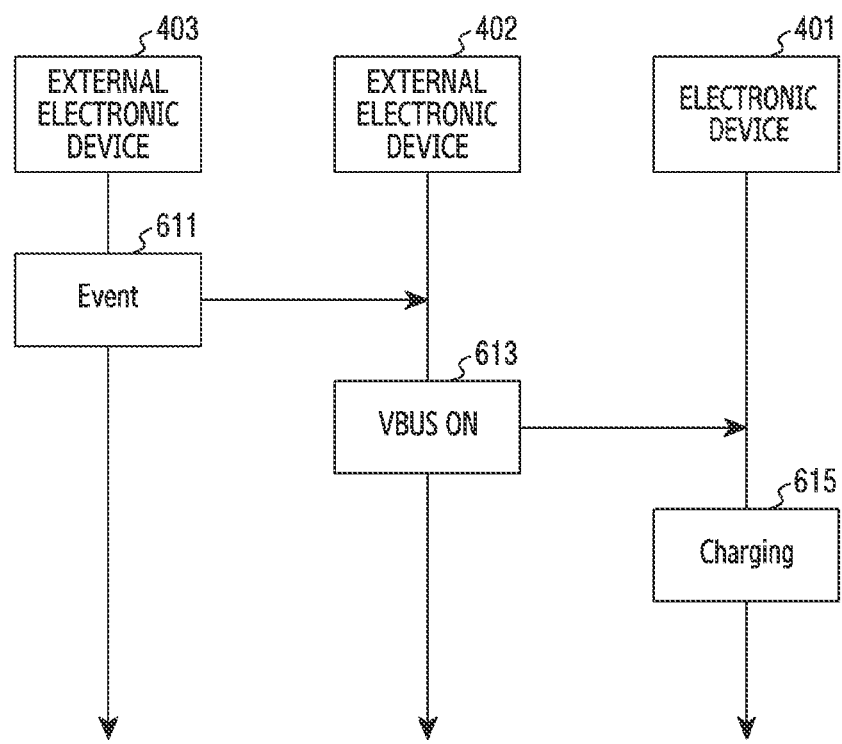
FIG. 6A is a diagram illustrating an example data transceiving process between an electronic device and an external electronic device according to various embodiments.

Referring to FIG. 6A, in operation 611, when an event occurs in the external electronic device 403, the external electronic device 403 may transmit an event notification regarding the occurred event to the external electronic device 402. In various embodiments, the processor 470 of the external electronic device 402 may receive the event notification from the external electronic device 403 through the communication module 480. In various embodiments, the event may be a front door open event of a car in which the external electronic device 403 is mounted. In various embodiments, the front door open event may be an event in which at least one of the front doors of the car in which the external electronic device 403 is mounted is opened. However, this should not be considered as limiting. In various embodiments, the car in which the external electronic device 403 is mounted may be a car including front doors and rear doors.

In operation 613, the processor 470 of the external electronic device 402 may turn on a power supply pin (for example, the VBUS pin shown in FIG. 3C) (VBUS ON) by applying at least one of a set voltage, current, or a combination thereof to the power supply pin (for example, the VBUS pin shown in FIG. 3C) based on the received event notification. In various embodiments, the processor 470 of the external electronic device 402 may control the power supply module 490 to apply at least one of the set voltage, current, or a combination thereof to the power supply pin. In various embodiments, the processor 470 of the external electronic device 402 may supply power to the electronic device 401 connected to the connector 450 by controlling the power supply module 490 to apply at least one of the set voltage, current, or a combination thereof to the power supply pin (for example, the VBUS pin shown in FIG. 3C). In various embodiments, the processor 470 of the external electronic device 402 may refine a state of the electronic device 401 into a charging state based on the power supply pin (for example, the VBUS pin shown in FIG. 3C) being turned on. In various embodiments, the state of the electronic device 401 may be stored in the memory 495 of the external electronic device 402.

In operation 615, the battery 440 of the electronic device 401 may be charged using power supplied from the external electronic device 402 through the connector 410. In various embodiments, when at least one of the set voltage, current, or a combination thereof is applied to the power supply pin of the connector 410, the processor 430 of the electronic device 401 may apply a set voltage to the data pin of the connector 410. In various embodiments, when at least one of the set voltage, current, or a combination thereof is applied to the power supply pin of the connector 410, the processor 430 of the electronic device 401 may drive the operating system according to a low power mode stored in the memory 491. In various embodiments, when at least one of the set voltage, current, or a combination thereof is applied to the power supply pin of the connector 410, the processor 430 of the electronic device 401 may drive the bootloader (not shown) and may drive the operating system according to the stored low power mode. In various embodiments, the processor 430 of the electronic device 401 may drive a CCR driver (for example, the CCR driver 431 shown in FIG. 4B) included in the bootloader. In various embodiments, when the CCR driver included in the bootloader (not shown) is driven, the processor 430 of the electronic device 401 may receive a command from the external electronic device 402 through an initially activated channel.

Figure 6B:
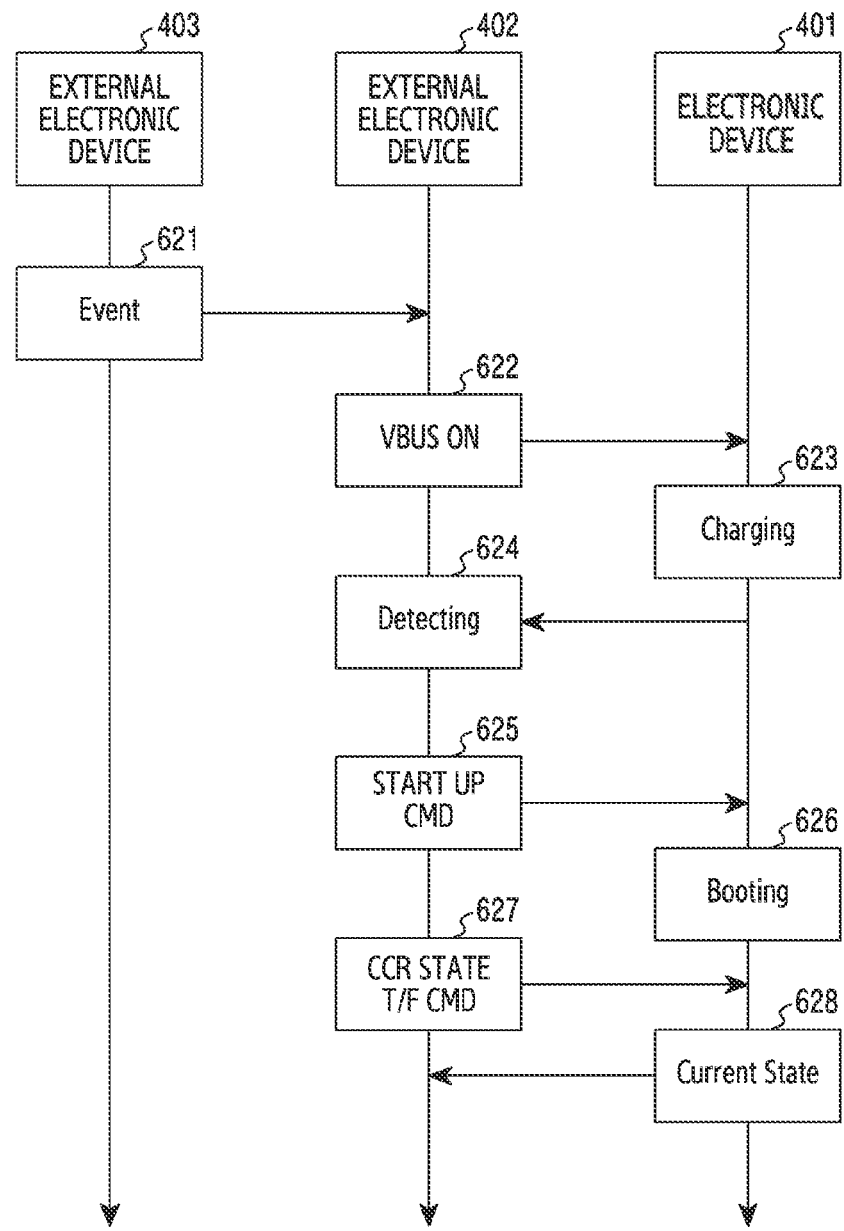
FIG. 6B is a diagram illustrating an example data transceiving process between the electronic device and the external electronic device according to various embodiments.

Referring to FIG. 6B, in operation 621, when an event occurs in the external electronic device 403, the external electronic device 403 may transmit an event notification regarding the occurred event to the external electronic device 402. In various embodiments, the processor 470 of the external electronic device 402 may receive the event notification from the external electronic device 403 through the communication module 480. In various embodiments, the event may be a rear door open event of a car in which the external electronic device 403 is mounted. In various embodiments, the rear door open event may be an event in which at least one of the rear doors of the car in which the external electronic device 403 is mounted is opened. In various embodiments, the car in which the external electronic device 403 is mounted may be a car including front doors and rear doors. In various embodiments, the processor 470 of the external electronic device 402 may identify whether an event notification occurs through an input button (not shown) (for example, a power key) of the external electronic device 402. In various embodiments, the processor 470 of the external electronic device 402 may identify that an event notification occurs when a user pushes an input button (not shown) (for example, the power key) of the external electronic device 402 for a set time in an off-state of the electronic device 401.

In operation 622, the processor 470 of the external electronic device 402 may turn on the power supply pin (for example, the VBUS pin shown in FIG. 3C) (VBUS ON) by applying at least one of a set voltage, current, or a combination thereof to the power supply pin (for example, the VBUS pin shown in FIG. 3C), based on the received event notification. In various embodiments, the processor 470 of the external electronic device 402 may refine a state of the electronic device 401 into a charging state based on the power supply pin (for example, the VBUS pin shown in FIG. 3C) being turned on. In various embodiments, the state of the electronic device 401 may be stored in the memory 495 of the external electronic device 402.

In operation 623, the battery 440 of the electronic device 401 may be charged using power supplied from the external electronic device 402 through the connector 410. In various embodiments, when at least one of the set voltage, current, or a combination thereof is applied to the power supply pin of the connector 410, the processor 430 of the electronic device 401 may drive the operating system according to the low power mode stored in the memory 491. In various embodiments, when at least one of the set voltage, current, or a combination thereof is applied to the power supply pin of the connector 410, the processor 430 of the electronic device 401 may drive the bootloader (not shown) and may drive the operating system according to the low power mode stored in the memory 491. In various embodiments, the processor 430 of the electronic device 401 may drive a CCR driver (for example, the CCR driver 431 shown in FIG. 4B) included in the bootloader (not shown). In various embodiments, when the CCR driver included in the bootloader (not shown) is driven, the processor 430 of the electronic device 401 may receive a command from the external electronic device 402 through an initially activated channel.

In operation 624, the processor 470 of the external electronic device 402 may detect the electronic device 401 based on at least one of the voltage, current of the power supply pin of the connector 450, or a combination thereof. In various embodiments, the processor 470 of the external electronic device 402 may detect the electronic device 401 by detecting a drop of the at least one of the voltage, current of the power supply pin, or a combination thereof that occurs as power is supplied to the electronic device 401 through the power supply pin of the connector 450. In various embodiment, when at least one of the set voltage, current or a combination thereof is applied to the power supply pin of the connector 410, the processor 430 of the electronic device 401 may apply a set voltage to the data pin of the connector 410. In various embodiments, when the set voltage is applied to the data pin, the processor 470 of the external electronic device 402 may obtain transmission speed information of the electronic device 401 through the data pin. In various embodiments, the processor 470 of the external electronic device 402 may perform at least one of enumeration, configuration of the electronic device 401, or a combination thereof through the initially activated channel, based on the obtained transmission speed information.

In operation 625, the processor 470 of the external electronic device 402 may transmit a start up command (START UP CMD) to the electronic device 401 through the initially activated channel, based on the obtained transmission speed information. In various embodiments, the start up command may be configured as shown, for example, in table 3 presented below:

TABLE 3

| bmRequest Type | bRequest | wValue | wIndex | wLength |
|---|---|---|---|---|
| 40 | F1 | 63 00 | 00 00 | 00 00 |

As shown in table 3, the entity of the bmRequest Type field of the start up command may be 0x40, the entity of the bRequest field may be 0xF1, the entity of the wValue field may be 0x0063, the entity of the wIndex field may be 0x0000, and the entity of the wLength field may be 0x0000. In various embodiments, the start up command may indicate that a request direction is from the external electronic device 402 to the electronic device 401, a request type is a vendor type, and a recipient is a device (for example, the device may be the electronic device 401 when the external electronic device 402 is a host) through the bmRequest Type field. In various embodiments, the start up command may indicate a newly defined command through the bRequest field. In various embodiments, the start up command may indicate that a message type is START UP and a data phase is omitted through the wValue field. In various embodiments, the start up command may not indicate a shut down time of the electronic device 401 through the wIndex field. In various embodiments, the start up command may indicate that a data phase is omitted through the wLength field. In various embodiments, the bmRequest Type, bRequest, wValue, wIndex, and wLength fields of the start up command (START UP CMD) may be fields that are defined in the setup packet format according to the USB standard.

In operation 626, the processor 430 of the electronic device 401 may boot (drive) the operating system (for example, the operating system 142 shown in FIG. 2) stored in the memory 491 of the electronic device 401, based on the start up command (START UP CMD). In various embodiments, the processor 430 of the electronic device 401 may drive the bootloader (not shown) and may boot (drive) the operating system (for example, the operating system 142 shown in FIG. 2) stored in the memory 491. In various embodiments, when the operating system is driven according to the low power mode, the processor 430 of the electronic device 401 may shut down the operating system according to the low power mode and then may drive the bootloader (not shown) and boot the operating system stored in the memory (not shown). In various embodiments, when the processor 430 of the electronic device 401 receives the start up command, the processor 430 of the electronic device 401 may transmit ACK to the start up command to the external electronic device 402.

In operation 627, the processor 470 of the external electronic device 402 may transmit a CCR state transfer command (CCR STATE T/F CMD) to the electronic device 401. In various embodiments, the processor 470 of the external electronic device 402 may generate the CCR state transfer command based on a set condition (for example, a set time interval). In various embodiments, the processor 470 of the external electronic device 402 may generate the CCR state transfer command at the set time intervals after transmitting the start up command to the electronic device 401. In various embodiments, the CCR state transfer command may be configured as shown, for example, in table 4 presented below:

TABLE 4

| bmRequest Type | bRequest | wValue | wIndex | wLength |
|---|---|---|---|---|
| C0 | F1 | 70 00 | 00 00 | 01 00 |

As shown in table 4, the entity of the bmRequest Type field of the CCR state transfer command may be 0xC0, the entity of the bRequest field may be 0xF1, the entity of the wValue field may be 0x0063, the entity of the wIndex may be 0x0000, and the entity of the wLength field may be 0x0100. In various embodiments, the CCR state transfer command may indicate that a request direction is from the electronic device 401 to the external electronic device 402, a request type is a vendor type, and a recipient is a device through the bmRequest Type field. In various embodiments, the CCR state transfer command may indicate that a message type is CCR STATE TRANSFER, and there exists a data phase through the wValue field. In various embodiments, the CCR state transfer command may indicate that data according to the data phase is 1 byte long through the wLength field. In various embodiments, the bmRequest Type, bRequest, wValue wIndex, and wLength fields of the CCR state transfer command (CCR STATE T/F CMD) may be fields that are defined in the setup packet format according to the USB standard.

In various embodiments, when the processor 470 of the external electronic device 402 does not receive a response to the CCR state transfer command from the electronic device 401 for a set time after transmitting the CCR state transfer command to the electronic device 401, the processor 470 may transmit the CCR state transfer command to the electronic device 401 again.

In operation 628, the processor 430 of the electronic device 401 may identify a current state (CURRENT STATE) based on the CCR state transfer command (CCR STATE T/F CMD). In various embodiments, the processor 430 of the electronic device 401 may generate data indicating the identified current state and may transmit the data to the external electronic device 402. In various embodiments, the processor 430 of the electronic device 401 may generate data indicating the current state among set states, and may transmit the data to the external electronic device 402. In various embodiments, the set states may include an unidentified state, a charging state, an on attachment state, a dimming attachment state, a power off state, or a shut down state. For example, when the processor 430 is being booted at the time of receiving the CCR state transfer command (CCR STATE T/F CMD), the processor 430 may generate data indicating that the processor 430 of the electronic device 401 in the data phase is in the booting state, and may transmit the data to the external electronic device 402. In another example, when the processor 430 of the electronic device 401 completes booting at the time of receiving the CCR state transfer command (CCR STATE T/F COMMAND), and then a display (for example, the display 497 shown in FIG. 4A) is turned on, the processor 430 of the electronic device 401 in a data phase may generate data indicating a screen-on state after booting, and may transmit the data to the external electronic device 402.

In various embodiments, when the processor 470 of the external electronic device 402 receives the data indicating the current state, the processor 470 of the external electronic device 402 may transmit ACK to the data indicating the current state to the electronic device 401. In various embodiments, the processor 470 of the external electronic device 402 may refine the current state of the electronic device 401 stored in the memory 495, based on the data indicating the current state.

Figure 6C:
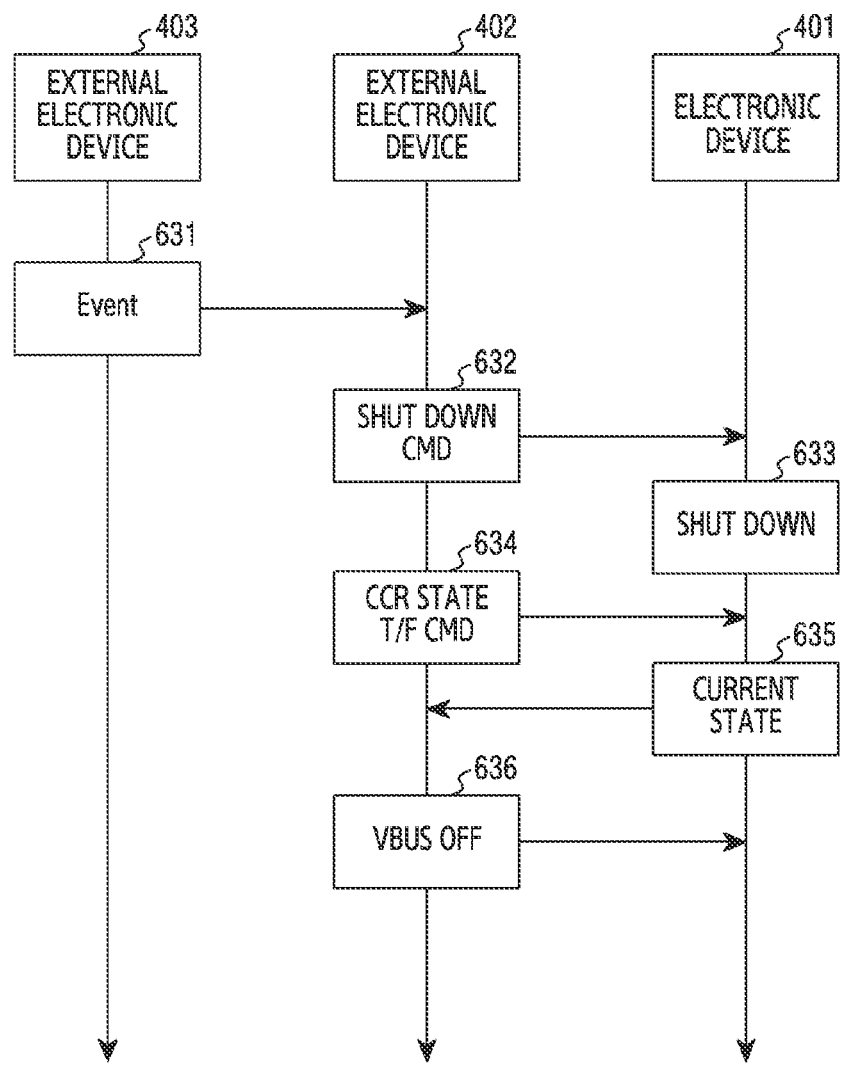
FIG. 6C is a diagram illustrating an example data transceiving process between the electronic device and the external electronic device according to various embodiments.

Referring to FIG. 6C, in operation 631, when an event occurs, the external electronic device 403 may transmit an event notification regarding the occurred event to the external electronic device 402. In various embodiments, the processor 470 of the external electronic device 402 may receive the event notification from the external electronic device 403 through the communication module 480. In various embodiments, the event may be a user get-off event of a car in which the external electronic device 403 is mounted. In various embodiments, the user get-off event may be an event in which a user sitting in a seat between rear doors of the car in which the external electronic device 403 is mounted gets off the car. However, this should not be considered as limiting. In various embodiments, the processor 470 of the external electronic device 402 may identify occurrence of an event notification through an input button (not shown) of the external electronic device 402. In various embodiments, the processor 470 of the external electronic device 402 may identify that an event notification occurs when a user pushes an input button (not shown) (for example, a power key) of the external electronic device 402 for a set time in an off state of the electronic device 401.

In operation 632, the processor 470 of the external electronic device 402 may transmit a shut down command (SHUT DOWN CMD) to the electronic device 401 through an initially activated channel, based on the received event notification. In various embodiments, the shut down command may be configured as shown, for example, in table 5 presented below:

TABLE 5

| bmRequest Type | bRequest | wValue | wIndex | wLength |
|---|---|---|---|---|
| 40 | F1 | 64 00 | 00 00 | 00 00 |

As shown in table 5, the entity of the bmRequest Type field of the shut down command may be 0x40, the entity of the bRequest field may be 0xF1, the entity of the wValue field may be 0x0064, the entity of the wIndex field may be 0x0000, and the entity of the wLength field may be 0x0000. In various embodiments, the shut down command may indicate that a message type is SHUT DOWN and a data phase is omitted through the wValue field. In various embodiments, when the message type of the wValue field indicates SHUT DOWN, an entity value of the wIndex field of the shut down command may indicate that the operating system is terminated after a set time. For example, when the message type of the wValue field indicates SHUT DOWN and an entity value of the wIndex field of the shut down command is 0x0000, the shut down command may indicate that the operating system is immediately terminated. In another example, when the message type of the wValue field indicates SHUT DOWN, and an entity value of the wIndex field of the shut down command is 0x0A00, the shut down command may indicate that the operating system is terminated after 10 seconds. In various embodiments, the bmRequest Type, bRequest, wValue, wIndex, and wLength fields of the shut down command (SHUT DOWN CMD) may be fields that are defined in the setup packet format according to the USB standard.

In operation 633, the processor 430 of the electronic device 401 may terminate the running operating system (for example, the operating system 142 shown in FIG. 2) based on the shut down command. In various embodiments, when the electronic device 401 receives the shut down command, the processor 430 of the electronic device 401 may transmit ACK to the shut down command to the external electronic device 402.

In operation 634, the processor 470 of the external electronic device 402 may transmit a CCR state transfer command (CCR STATE T/F CMD) to the electronic device 401. In various embodiments, the processor 470 of the external electronic device 402 may generate the CCR state transfer command based on a set condition (for example, a set time interval). In various embodiments, the processor 470 of the external electronic device 402 may generate the CCR state transfer command at the set time intervals after transmitting the shut down command. In various embodiments, the CCR state transfer command may be configured as shown in table 4 presented above.

In operation 635, the processor 430 of the electronic device 401 may identify a current state (CURRENT STATE) based on the CCR state transfer command. In various embodiments, the processor 430 of the electronic device 401 may generate data indicating the identified current state, and may transmit the data to the external electronic device 402. For example, when the processor 430 completes termination of the operating system at the time of receiving the CCR state transfer command, the processor 430 may generate data indicating that the processor 430 of the electronic device 401 in the data phase is in a shut down state, and may transmit the data to the external electronic device 402.

In various embodiments, when the processor 470 of the external electronic device 402 receives the data indicating the current state, the processor 470 of the external electronic device 402 may transmit ACK to the data indicating the current state to the electronic device 401. In various embodiments, the processor 470 of the external electronic device 402 may refine the current state of the electronic device 401 stored in the memory 495 based on the data indicating the current state.

In operation 636, when the processor of the external electronic device 402 receives the data indicating the shut down state, the processor of the external electronic device 402 may turn off at least one of a voltage, current of the power supply pin (for example, the VBUS pin of FIG. 3C), or a combination thereof (VBUS OFF). In various embodiments, the processor 470 of the external electronic device 402 may control the power supply module 490 to turn off at least one of a set voltage, current applied to the power supply pin, or a combination thereof. In various embodiments, the processor 470 of the external electronic device 402 may stop power supply to the electronic device 401 connected to the connector 450 by controlling the power supply module 490 to turn off at least one of the set voltage, current applied to the power supply pin, or a combination thereof.

Figure 6D:
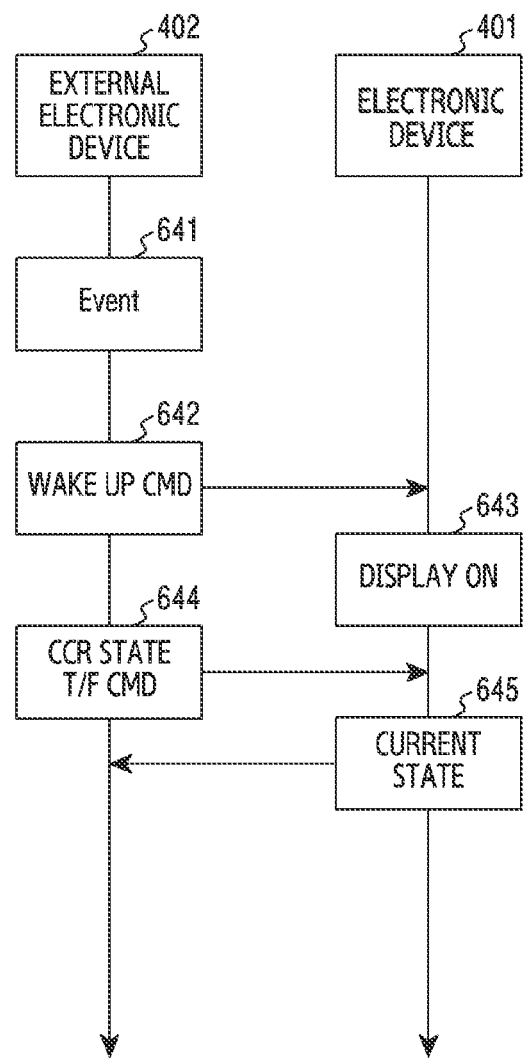
FIG. 6D is a diagram illustrating an example data transceiving process between the electronic device and the external electronic device according to various embodiments.

Referring to FIG. 6D, in operation 641, the processor 470 of the external electronic device 402 may identify occurrence of an event. In various embodiments, when a user pushes an input button (not shown) (for example, the power key) of the external electronic device 402 in an off state of the display 497 after booting of the electronic device 401 is completed, the processor 470 of the external electronic device 402 may identify that an event occurs. However, this should not be considered as limiting.

In operation 642, the processor 470 of the external electronic device 402 may transmit a wake up command (WAKE UP CMD) to the electronic device 401 through an initially activated channel, based on the received event notification. In various embodiments, the wake up command may be configured as shown, for example, in table 6 presented below:

TABLE 6

| bmRequest Type | bRequest | wValue | wIndex | wLength |
|---|---|---|---|---|
| 40 | F1 | 67 00 | 00 00 | 00 00 |

As shown in table 6, the entity of the bmRequest Type field of the wake up command may be 0x40, the entity of the bRequest field may be 0xF1, the entity of the wValue field may be 0x0067, the entity of the wIndex field may be 0x0000, and the entity of the wLength field may be 0x0000. In various embodiments, the wake up command may indicate that a message type is WAKE UP and a data phase is omitted through the wValue field. In various embodiments, the bmRequest Type, bRequest, wValue, wIndex, and wLength fields of the wake up command (WAKE UP CMD) may be fields that are defined in the setup packet format according to the USB standard.

In operation 643, the processor 430 of the electronic device 401 may turn on the display 497 of the electronic device 401 (DISPLAY ON) based on the wake up command. In various embodiments, when the electronic device 401 receives the wake up command, the processor 430 of the electronic device 401 may transmit ACK to the wake up command to the external electronic device 402. In various embodiments, the processor 470 of the external electronic device 402 may refine a state of the electronic device 401 into a display on state after booting, based on the ACK to the wake up command.

In operation 644, the processor 470 of the external electronic device 402 may transmit a CCR state transfer command (CCR STATE T/F CMD) to the electronic device 401. In various embodiments, the CCR state transfer command may be configured as shown in table 4 presented above.

In operation 645, the processor 430 of the electronic device 401 may identify a current state (CURRENT STATE) based on the CCR state transfer command. In various embodiments, the processor 430 of the electronic device 401 may generate data indicating the identified current state and may transmit the data to the external electronic device 402. In various embodiments, when the processor 470 of the electronic device 402 receives the data indicating the current state, the processor 470 of the external electronic device 402 may transmit ACK to the data indicating the current state to the electronic device 401. In various embodiments, the processor 470 of the external electronic device 402 may refine the current state of the electronic device 401 stored in the memory 495 based on the data indicating the current state.

Figure 6E:
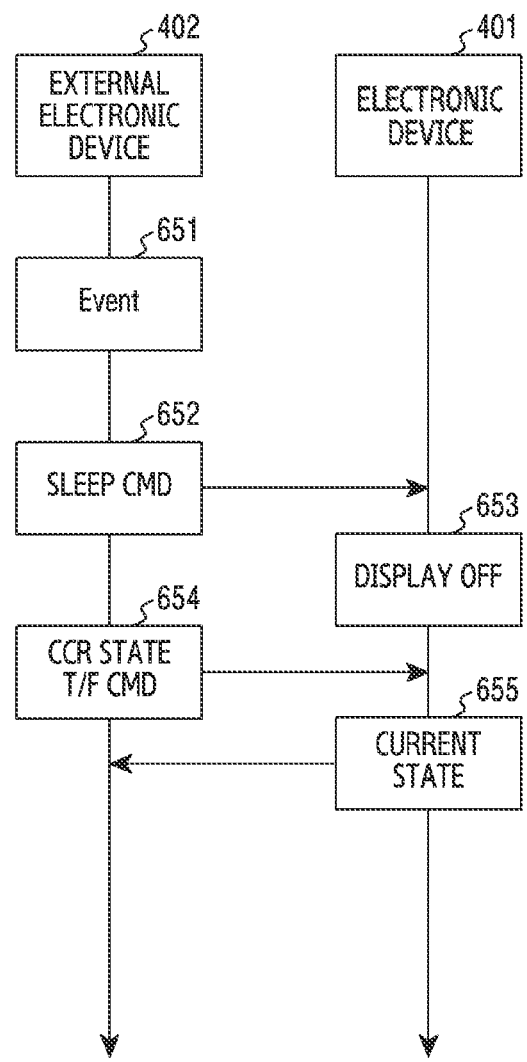
FIG. 6E is a diagram illustrating an example data transceiving process between the electronic device and the external electronic device according to various embodiments.

Referring to FIG. 6E, in operation 651, the processor 470 of the external electronic device 402 may identify occurrence of an event. In various embodiments, when a user pushes an input button (not shown) (for example, the power key) of the external electronic device 402 in an on state of the display 497 after booting of the electronic device 401 is completed, the processor 470 of the external electronic device 402 may identify that an event occurs. However, this should not be considered as limiting.

In operation 652, the processor 470 of the external electronic device 402 may transmit a sleep command (SLEEP CMD) to the electronic device 401 through an initially activated channel, based on the identified event notification. In various embodiments, the sleep command may be configured as shown, for example, in table 7 presented below:

TABLE 7

| bmRequest Type | bRequest | wValue | wIndex | wLength |
|---|---|---|---|---|
| 40 | F1 | 66 00 | 00 00 | 00 00 |

As shown in table 7, the entity of the bmRequest Type field of the sleep command may be 0x40, the entity of the bRequest field may be 0xF1, the entity of the wValue field may be 0x0066, the entity of the wIndex field may be 0x0000, and the entity of the wLength field may be 0x0000. In various embodiments, the sleep command may indicate that a message type is SLEEP and a data phase is omitted through the wValue field. In various embodiments, the bmRequest Type, bRequest, wValue, wIndex, and wLength fields of the sleep command (SLEEP CMD) may be fields that are defined in the setup packet format according to the USB standard.

In operation 653, the processor 430 of the electronic device 401 may turn off the display 497 of the electronic device 401 (DISPLAY OFF) based on the sleep command. In various embodiments, when the electronic device 401 receives the sleep command, the processor 430 of the electronic device 401 may transmit ACK to the sleep command to the external electronic device 402.

In operation 654, the processor 430 of the electronic device 401 may transmit a CCR state transfer command (CCR STATE T/F CMD) to the electronic device 401. In various embodiments, the CCR state transfer command may be configured as shown in table 4 presented above.

In operation 655, the processor 430 of the electronic device 401 may identify a current state (CURRENT STATE) based on the CCR state transfer command. In various embodiments, the processor 430 of the electronic device 401 may generate data indicating the identified current state and may transmit the data to the external electronic device 402. In various embodiments, when the processor 470 of the external electronic device 402 receives the data indicating the current state, the processor 470 of the external electronic device 402 may transmit ACK to the data indicating the current state to the electronic device 401. In various embodiments, the processor 470 of the external electronic device 402 may refine the current state of the electronic device 401 stored in the memory 495 based on the data indicating the current state.

Figure 6F:
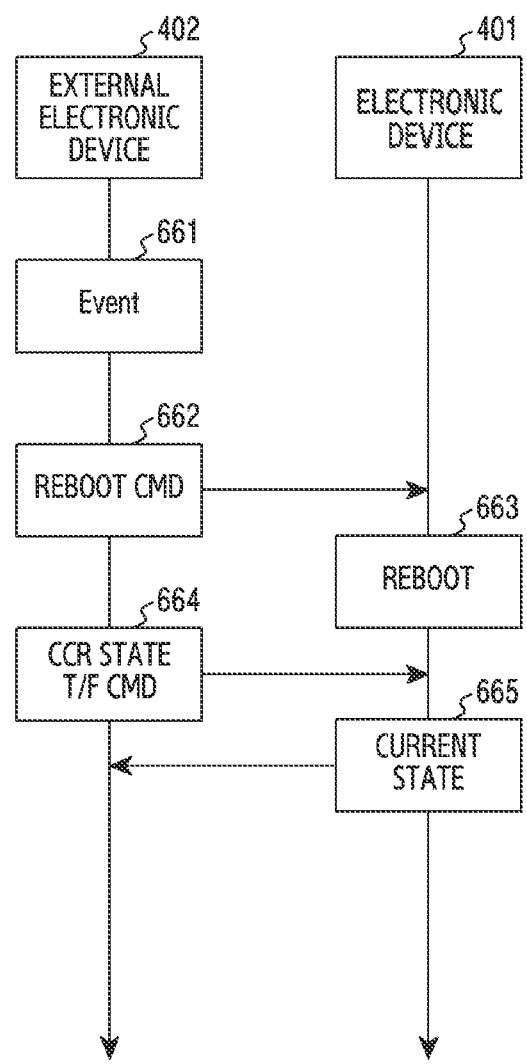
FIG. 6F is a diagram illustrating an example data transceiving process between the electronic device and the external electronic device according to various embodiments.

Referring to FIG. 6F, in operation 661, the processor 470 of the external electronic device 402 may identify occurrence of an event. In various embodiments, when ACK to a CMD is not received in a state in which a user completes booting of the electronic device 401, the processor 470 of the external electronic device 402 may identify that an event occurs. However, this should not be considered as limiting. In various embodiments, the processor 470 of the external electronic device 402 may identify that an event occurs when a user pushes input buttons (not shown) (for example, a power button) of the external electronic device 402 during a set period. However, this should not be considered as limiting.

In operation 662, the processor 470 of the external electronic device 402 may transmit a reboot command (REBOOT CMD) to the electronic device 401 through an initially activated channel, based on the event notification. In various embodiments, the reboot command may be configured as shown, for example, in table 8 presented below:

TABLE 8

| bmRequest Type | bRequest | wValue | wIndex | wLength |
|---|---|---|---|---|
| 40 | F1 | 65 00 | 00 00 | 00 00 |

As shown in table 8, the entity of the bmRequest Type field of the reboot command may be 0x40, the entity of the bRequest field may be 0xF1, the entity of the wValue field may be 0x0065, the entity of the wIndex field may be 0x0000, and the entity of the wLength field may be 0x0000. In various embodiments, the reboot command may indicate that a message type is REBOOT and a data phase is omitted through the wValue field. In various embodiments, the bmRequest Type, bRequest, wValue, wIndex, and wLength fields of the reboot command (REBOOT CMD) may be fields that are defined in the setup packet format according to the USB standard.

In operation 663, the processor 430 of the electronic device 401 may reboot after terminating the running operating system (for example, the operating system 142 shown in FIG. 2), based on the reboot command. In various embodiments, when the running operating system (for example, the operating system 142 shown in FIG. 2) is terminated, the processor 430 of the electronic device 401 may drive the bootloader (not shown) and may reboot the operating system (for example, the operating system 142 shown in FIG. 2). In various embodiments, when the electronic device 401 receives the reboot command, the electronic device 401 may transmit ACK to the reboot command to the external electronic device 402.

In operation 664, the processor 430 of the electronic device 401 may transmit a CCR state transfer command (CCR STATE T/F CMD) to the electronic device 401. In various embodiments, the CCR state transfer command may be configured as shown in table 4 presented above.

In operation 665, the processor 430 of the electronic device 401 may identify a current state (CURRENT STATE) based on the CCR state transfer command. In various embodiments, the processor 430 of the electronic device 401 may generate data indicating the identified current state, and may transmit the data to the external electronic device 402. In various embodiments, when the processor 470 of the external electronic device 402 receives the data indicating the current state, the processor 470 of the external electronic device 402 may transmit ACK to the data indicating the current state to the electronic device 401. In various embodiments, the processor 470 of the external electronic device 402 may refine the current state of the electronic device 401 stored in the memory 495 based on the data indicating the current state.

Figure 7:
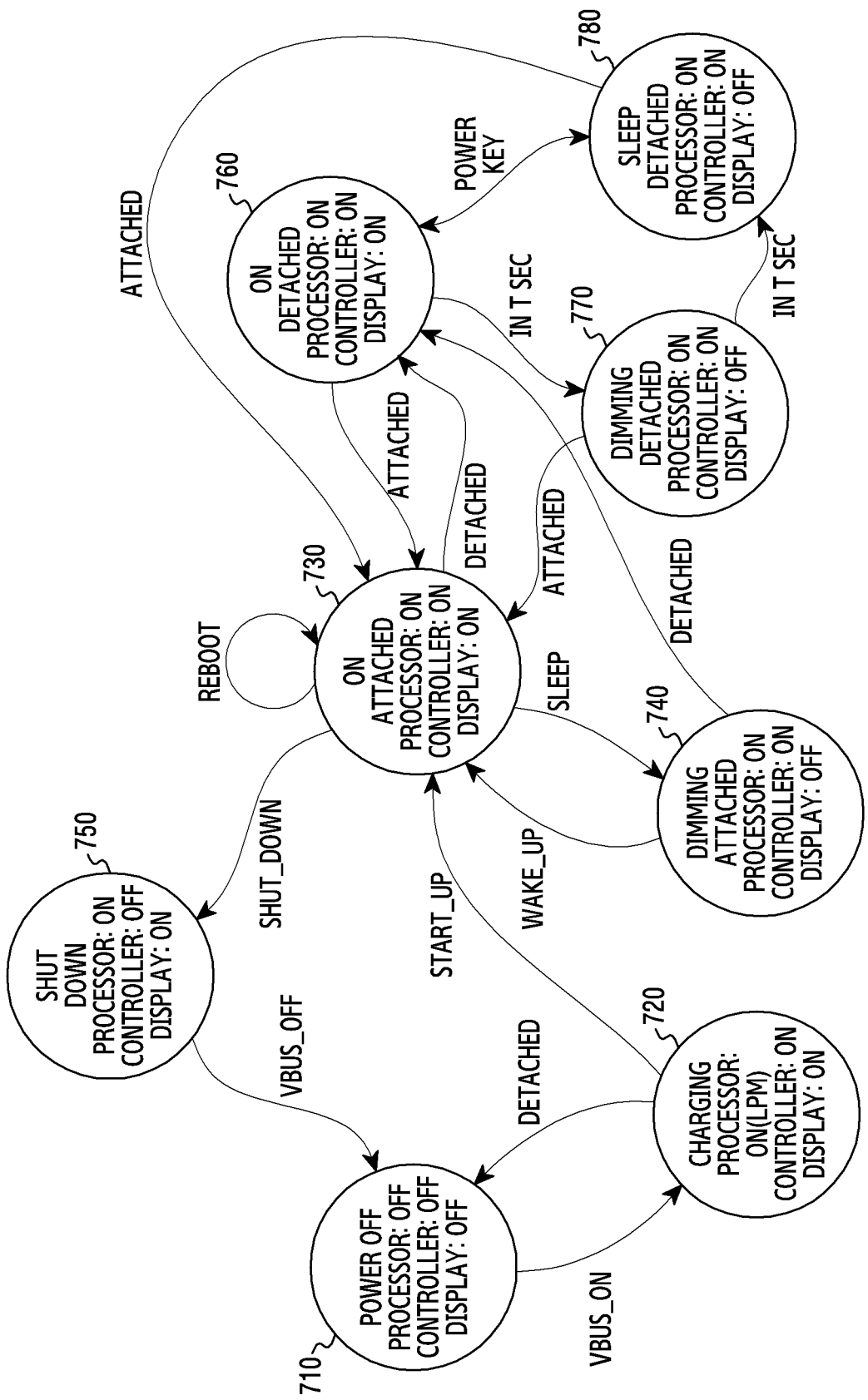
FIG. 7 is a diagram illustrating example states of an electronic device according to various embodiments.

FIG. 7 is a diagram illustrating example states of the electronic device 401 according to various embodiments. FIG. 7 will be described with reference to the configurations of the electronic device 401, the external electronic device 402, and the external electronic device 403 shown in FIG. 4A.

As shown in FIG. 7, the electronic device 401 may have various states. In various embodiments, when the external electronic device 402 is connected with the electronic device 401 through the connector 450, the external electronic device 402 may obtain information regarding a current state of the electronic device 401 through data regarding a CCR state transfer command (CCR STATE T/F CMD).

Referring to FIG. 7, in various embodiments, a power off state 710 (POWER OFF) may indicate that the processor 430 is in an OFF state, a controller (not shown) (for example, a USB controller) is in an OFF state, and the display 497 is in an OFF state. In various embodiments, the OFF state of the controller (not shown) (for example, the USB controller) may indicate a state in which a set voltage is not applied to the power supply pin (for example, the VBUS pin shown in FIG. 3C) among the pins of the connector 410. In various embodiments, in the power off state 710 (POWER OFF), the electronic device 401 may be shifted to a charging state 720 (CHARGING) when the power supply pin of the connector 450 of the external electronic device 402 is turned on (VBUS ON), and at least one of a set voltage, current or a combination thereof is applied to the power supply pin.

Referring to FIG. 7, according to various embodiments, the charging state 720 (CHARGING) may indicate that the processor 430 is in an ON state in which the operating system according to the low power mode (LPM) is driven, the controller (not shown) (for example, the USB controller) is in an ON state, and the display 497 is in an ON state. In various embodiments, the ON state of the controller (not shown) (for example, the USB controller) may indicate a state in which a set voltage is applied to the power supply pin (for example, the VBUS pin shown in FIG. 3C) among the pins of the connector 410. In various embodiments, when the electronic device 401 receives a start up command (START UP) from the external electronic device 402 in the charging state 720 (CHARGING), the electronic device 401 may be shifted to an on attachment state 730 (ON ATTACHED). In various embodiments, when the electronic device 401 is detached from the external electronic device (DETACHED) in the charging state 720 (CHARGING), the electronic device 401 may be shifted to the power off state 710 (POWER OFF).

Referring to FIG. 7, the on attachment state 730 (ON ATTACHED) may indicate that the processor 430 is in the ON state in which the operating system (for example, the operating system 142 shown in FIG. 2) is driven, the controller (not shown) (for example, the USB controller) is in the ON state, and the display 497 is in the ON state. In various embodiments, the operating system running in states other than the charging state 720 (CHARGING) may be distinct from the operating system of the lower power mode running in the charging state 720 (CHARGING). However, this should not be considered as limiting.

In various embodiments, when the electronic device 401 receives a reboot command (REBOOT) from the external electronic device 402 in the on attachment state 730 (ON ATTACHED), the electronic device 401 may be shifted to the on attachment state 730 (ON ATTACHED). In various embodiments, when the electronic device 401 receives a sleep command from the external electronic device 402 in the on attachment state 730 (ON ATTACHED), the electronic device 401 may be shifted to a dimming attachment state 740 (DIMMING ATTACHED). In various embodiments, when the electronic device 401 does not receive a user input through a touch screen (not shown) of the display 497 or does not receive a command from the external electronic device 402 for a set time in the on attachment state 730 (ON ATTACHED), the electronic device 401 may be shifted to the dimming attachment state 740 (DIMMING ATTACHED). In various embodiments, when the electronic device 401 receives a shut down command (SHUT DOWN) from the external electronic device 402 in the on attachment state 730 (ON ATTACHED), the electronic device 401 may be shifted to a shut down state 750 (SHUT DOWN). In various embodiments, when the electronic device 401 is detached from the external electronic device 402 in the on attachment state 730 (ON ATTACHED), the electronic device 401 may be shifted to an on detachment state 760 (ON DETACHED). In various embodiments, when THE voltage of the power supply pin of the connector 410 falls out of a set voltage range (for example, 4.5 V or higher), the processor 430 of the electronic device 401 may identify that the electronic device 401 is detached from the external electronic device 402.

Referring to FIG. 7, the dimming attachment state 740 (DIMMING ATTACHED) may indicate that the processor 430 is in the ON state in which the operating system is driven, the controller (not shown) (for example, the USB controller) is in the ON state, and the display 497 is in the OFF state. In various embodiments, the dimming attachment state 740 (DIMMING ATTACHED) may be a state in which the electronic device 401 may turn off the display 497 while reducing illuminance of the display 497. In various embodiments, when the electronic device 401 receives a wake up command (WAKE_UP) from the external electronic device 402 in the dimming attachment state 740 (DIMMING ATTACHED), the electronic device 401 may be shifted to the on attachment state 730 (ON ATTACHED). In various embodiments, when the electronic device 401 is detached from the external electronic device 402 in the dimming attachment state 740 (DIMMING ATTACHED), the electronic device 401 may be shifted to the on detachment state 760 (ON DETACHED).

Referring to FIG. 7, the shut down state 750 may indicate that the processor 430 is in the ON state in which the operating system (for example, the operating system 142 shown in FIG. 2) is driven, the controller (not shown) (for example, the USB controller) is in the OFF state, and the display 497 is in the ON state. In various embodiment, when the power supply pin of the connector 450 of the external electronic device 402 is turned off (VBUS_OFF) and power supply from the external electronic device 402 is stopped in the shut down state 750 (SHUT DOWN), the electronic device 401 may be shifted to the power off state 710 (POWER OFF). In various embodiments, when a voltage of the power supply pin of the connector 410 falls out of a set voltage range (for example, 4.5 V or higher), the electronic device 401 may identify that power supply from the external electronic device 402 is stopped.

Referring to FIG. 7, the on detachment state 760 (ON DETACHED) may indicate that the processor 430 is in the ON state in which the operating system (for example, the operating system 142 shown in FIG. 2) is driven, the controller (not shown) (for example, the USB controller) is in the ON state, and the display 497 is in the ON state. In various embodiments, when the electronic device 401 is attached to the external electronic device 402 in the on detachment state 760 (ON DETACHED), the electronic device 401 may be shifted to the on attachment state 730 (ON ATTACHED). In various embodiments, when a voltage of the power supply pin of the connector 410 falls within the set voltage range (for example, 4.5 V or higher), the processor 430 of the electronic device 401 may identify that the electronic device 401 is attached to the external electronic device 402. In various embodiments, when the electronic device 401 does not receive a user input through an input device (for example, a touch screen) for a set time in the on detachment state 760 (ON DETACHED), the electronic device 401 may be shifted to a dimming detachment state 770 (DIMMING DETACHED) after a set time (IN T SEC). In various embodiments, when a user pushes an input button (not shown) (for example, the power key) in the on detachment state 760 (ON DETACHED), the electronic device 401 may be shifted to a sleep detachment state 780 (SLEEP DETACHED).

Referring to FIG. 7, the dimming detachment state 770 (DIMMING DETACHED) may indicate that the processor 430 is in the ON state in which the operating system (for example, the operating system 142 shown in FIG. 2) is driven, the controller (not shown) (for example, the USB controller) is in the ON state, and the display 497 is in the OFF state. In various embodiments, the dimming detachment state 770 (DIMMING DETACHED) may be a state in which the electronic device 401 turns off the display 497 while reducing illuminance of the display 497. In various embodiments, when the electronic device 401 is attached to the external electronic device 402 in the dimming detachment state 770 (DIMMING DETACHED), the electronic device 401 may be shifted to the on attachment state 730 (ON ATTACHED). In various embodiments, when a user input is not received through an input device (for example, a touch screen) for a set time in the dimming detachment state 770 (DIMMING DETACHED), the electronic device 401 may be shifted to the sleep detachment state 780 (SLEEP DETACHED) after a set time (IN T SEC).

Referring to FIG. 7, the sleep detachment state 780 (SLEEP DETACHED) may indicate that the processor 430 is in the ON state in which the operating system (for example, the operating system 142 shown in FIG. 2) is driven, the controller (not shown) (for example, the USB controller) is in the ON state, and the display 497 is in the OFF state. In various embodiments, when the electronic device 401 is attached to the external electronic device 402 in the sleep detachment state 780 (SLEEP DETACHED), the electronic device 401 may be shifted to the on attachment state 730 (ON ATTACHED). In various embodiments, when the user pushes an input button (for example, the power key) in the sleep detachment state 780 (SLEEP DETACHED), the electronic device 401 may be shifted to the on detachment state 760 (ON DETACHED).

Figure 8A:
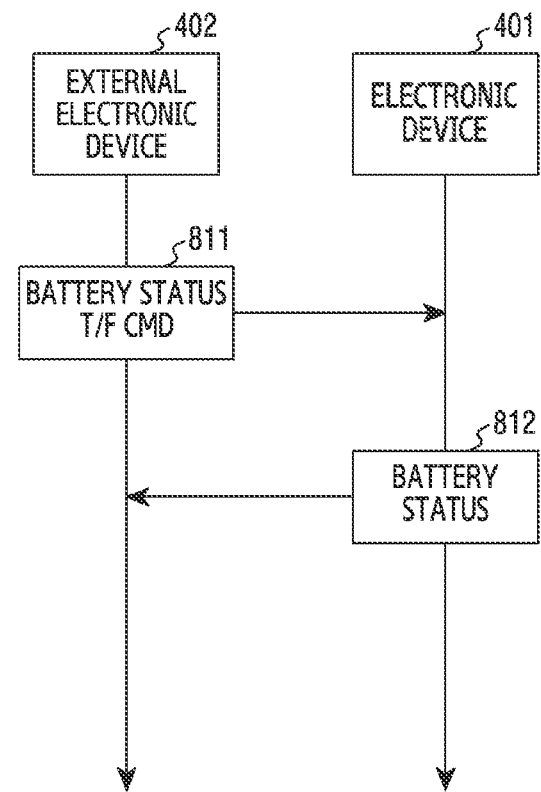
FIG. 8A is a diagram illustrating an example data transceiving process between an electronic device and an external electronic device according to various embodiments.

FIG. 8A is a diagram illustrating an example data transceiving process between an electronic device and an external electronic device according to various embodiments. FIG. 8A will be described with reference to the configurations of the electronic device 401, the external electronic device 402, and the external electronic device 403 shown in FIG. 4A.

Referring to FIG. 8A, in operation 811, the processor 470 of the external electronic device 402 may generate a battery status transfer command (BATTERY STATUS T/F CMD), and may transmit the generated battery status transfer command (BATTERY STATUS T/F CMD) to the electronic device 401. In various embodiments, the processor 470 of the external electronic device 402 may generate the battery status transfer command based on a set condition (for example, a set time interval). In various embodiments, the processor 470 of the external electronic device 402 may generate the battery status transfer command at the set time intervals after a state of the electronic device 401 is refined into the on attachment state. In various embodiments, the battery status transfer command may be configured as shown, for example, in table 9 presented below:

TABLE 9

| bmRequest Type | bRequest | wValue | wIndex | wLength |
|---|---|---|---|---|
| C0 | F1 | 97 00 | 00 00 | 04 00 |

As shown in table 9, the entity of the bmRequest Type field of the battery status transfer command may be 0xC0, the entity of the bRequest field may be 0xF1, the entity of the wValue field may be 0x0097, the entity of the wIndex field may be 0x0000, and the entity of the wLength field may be 0x0004. In various embodiments, the battery status transfer command may indicate that a request direction is from the electronic device 401 to the external electronic device 402, a request type is a vendor type, and a recipient is a device (for example, when the external electronic device 402 is a host, the device is the electronic device 401), through the bmRequest Type field. In various embodiments, the battery status transfer command may indicate that a message type is BATTERY STATUS TRANSFER and there exists a data phase, through the wValue field. In various embodiments, the battery status transfer command may indicate that data according to the data phase is 4 bytes long, through the wLength field. In various embodiments, the bmRequest Type, bRequest, wValue, wIndex, and wLength fields of the battery status transfer command (BATTERY STATUS T/F CMD) may be fields that are defined in the setup packet format according to the USB standard.

In operation 812, the processor 430 of the electronic device 401 may identify a current status of the battery 440 of the electronic device 401, based on the battery status transfer command, may generate data indicating the identified current status of the battery 440, and may transmit the data to the external electronic device 402. In various embodiments, the data indicating the current status of the battery 440 may be configured as shown, for example, in table 10 presented below:

TABLE 10

| BATTERY LEVEL | BATTERY HEALTH | CHARGING STATE | BATTERY TEMPERATURE |
|---|---|---|---|

As shown in table 10, the data indicating the current status of the battery 440 may be configured with battery level, battery health, charging state, and battery temperature fields.

In table 10, the battery level field may be 1 byte long. In various embodiments, an entity of the battery level field may have an integer value between 0 and 100 or a value of 255. In various embodiments, an integer value between 0 and 100 that the entity of the battery level field may have may indicate a value according to a charging percentage of the battery. In various embodiments, when the entity of the battery level field indicates an integer value of 255, it may be indicated that the charging percentage of the battery 440 is not known.

In table 10, the battery health field may be 1 byte long. In various embodiments, the entity of the battery health field may have values corresponding to types of battery health. In various embodiments, when there are seven types of battery health set, the entity of the battery health field may have 7 values. For example, when types of battery health are set to an unknown state, a good state, an over heat state, a dead state, an over voltage state, an unspecified failure state, or a cold state, the entity of the battery health may have a value indicating one of the unknown state, the good state, the over heat state, the dead state, the over voltage state, the unspecified failure state, or the cold state.

In table 10, the charging state field may be 1 byte long. In various embodiments, the entity of the charging state field may have values corresponding to set types of charging states. In various embodiments, when there are five types of charging states set, the entity of the charging state field may have 5 values. For example, when types of charging states are set to a unknown state, a charging state, a discharging state, a not-charging state, or a full state, the entity of the charging state field may have a value indicating one of the unknown state, the charging state, the discharging state, the not-charging state, or the full state.

In table 10, the battery temperature field may be 1 byte long. In various embodiments, the entity of the battery temperature field may have an integer value between −128 and 127. In various embodiments, an integer value between −128 and 127 that the entity of the battery temperature field may have may indicate a value according to temperature of the battery.

In various embodiments, when the processor 470 of the external electronic device 402 receives the data indicating the current status of the battery 440, the processor 470 of the external electronic device 402 may transmit ACK to the data indicating the current status of the battery 440 to the electronic device 401. In various embodiments, the processor 470 of the external electronic device 402 may refine the current status of the battery 440 of the electronic device 401 based on the data indicating the current status of the battery 440.

In various embodiments, the processor 470 of the external electronic device 402 may control the power supply pin based on the data indicating the current status of the battery received. In various embodiments, the processor 470 of the external electronic device 402 may determine whether to apply at least one of a set voltage, current or a combination thereof to the power supply pin, based on the data indicating the current status of the battery 440 received. For example, when the data indicating the current status of the battery 440 indicates the over heat state, the processor 470 of the external electronic device 402 may stop power supply to the electronic device 401 connected to the connector 450 by controlling the power supply module 490 to turn off the at least one of the voltage, current applied to the power supply pin, or a combination thereof. In another example, when the data indicating the current status of the battery 440 indicates a battery level lower than or equal to a set level, the processor 470 of the external electronic device 402 may supply power to the electronic device 401 connected to the connector 450 by controlling the power supply module 490 to apply at least one of the set voltage, current or a combination thereof to the power supply pin. However, this should not be considered as limiting.

Figure 8B:
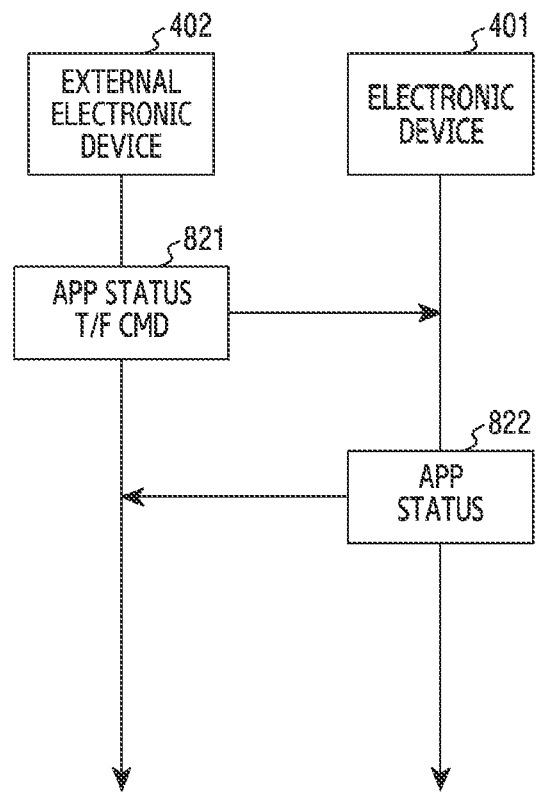
FIG. 8B is a diagram illustrating an example data transceiving process between the electronic device and the external electronic device according to various embodiments.

FIG. 8B is a diagram illustrating an example data transceiving process between an electronic device and an external electronic device according to various embodiments. FIG. 8B will be described with reference to the configurations of the electronic device 401, the external electronic device 402, and the external electronic device 403 shown in FIG. 4A.

Referring to FIG. 8B, in operation 821, the processor 470 of the external electronic device 402 may transmit an application status transfer command (APP STATUS T/F CMD) to the electronic device 401. In various embodiments, the processor 470 of the external electronic device 402 may generate the application status transfer command based on a set condition (for example, a set time interval). In various embodiments, the processor 470 of the external electronic device 402 may generate the application status transfer command at the set time intervals after a state of the electronic device 401 is refined into the on attachment state. In various embodiments, the application status transfer command may be configured as shown, for example, in table 11 presented below:

TABLE 11

| bmRequest Type | bRequest | wValue | wIndex | wLength |
|---|---|---|---|---|
| C0 | F1 | 99 00 | 00 00 | 01 00 |

As shown in table 11, the entity of the bmRequest Type field of the application status transfer command may be 0xC0, the entity of the bRequest field may be 0xF1, the entity of the wValue field may be 0x0099, the entity of the wIndex field may be 0x0000, and the entity of the wLength field may be 0x0001. In various embodiments, the application status transfer command may indicate that a request direction is from the electronic device 401 to the external electronic device 402, a request type is a vendor type, and a recipient is a device (for example, when the external electronic device 402 is a host, the device is the electronic device 401), through the bmRequest Type field. In various embodiments, the application status transfer command may indicate that a message type is APP ACTIVITY STATUS TRANSFER and there exists a data phase, through the wValue field. In various embodiments, the application status transfer command may indicate that data according to the data phase is 1 byte long, through the wLength field. In various embodiments, the bmRequest Type, bRequest, wValue, wIndex, and wLength fields of the application status transfer command (APP STATUS T/F CMD) may be fields that are defined in the setup packet format according to the USB standard.

In operation 822, the processor 430 of the electronic device 401 may identify a current status of a running application (for example, the application 146 of FIG. 2) of the electronic device 401, based on the application status transfer command, may generate data indicating the identified current status of the application (for example, the application 146 of FIG. 2), and may transmit the data to the external electronic device 402. In various embodiments, the current status of the running application may be one of an application activity state, an unknown state, an operating system-not-running state, a foreground activity state (activity in foreground), a background activity state (activity in background), an activity-not-running state, or a command touch APP not-installed state.

In various embodiments, when the processor 470 of the external electronic device 402 receives the data indicating the current status of the running application, the processor 470 of the external electronic device 402 may transmit ACK to the data indicating the current status of the running application to the electronic device 401. In various embodiments, the processor 470 of the external electronic device 402 may refine the current status of the running application of the electronic device 401 based on the data indicating the current status of the running application.

According to various example embodiments as described above, an electronic device (for example, the electronic device 401) may include: a connector configured to be connected with an external electronic device; a memory configured to store instructions; and a processor configured to execute the stored instructions, the instructions, when executed by the processor, cause the processor to control the electronic device to: identify a control signal received through a channel initially activated based on the external electronic device being connected to the connector from among a plurality of channels, and to perform control based on a message included in the identified control signal.

In various example embodiments, based on power being supplied from the external electronic device through the connector, the processor may be configured to control the electronic device to drive a first operating system in a power off state.

In various embodiments, the message included in the identified control signal may include a start up command, and the processor may be configured to control the electronic device to drive a second operating system based on the start up command included in the message.

In various example embodiments, the processor may be configured to control the electronic device to identify another control signal received through the initially activated channel based on the second operating system being driven, and to perform control based on a message included in the identified another control signal.

In various example embodiments, the identified another control signal may be generated from the external electronic device based on a response to at least one control signal among a plurality of control signals transmitted by the external electronic device based on the second operating system being driven not being received from the electronic device. The message included in the identified another control signal may include a reboot command, and the processor may be configured to control the electronic device to drive the second operating system again based on the reboot command included in the message of the identified another control signal.

In various example embodiments, the identified another control signal may be generated from the external electronic device based on an event that the external electronic device receives from another external electronic device. A message included in the identified another control signal may include a shut down command. The processor may be configured to control the electronic device to shut down the second operating system based on the shut down command included in the message of the identified another control signal.

In various example embodiments, the event may include an open event of a door of a car detected by the another external electronic device.

In various example embodiments, the electronic device may further include a battery configured to supply a power to the electronic device.

The message included in the identified control signal may include a battery status transfer command, and the processor may be configured to control the electronic device to generate data including battery health information of the battery based on the battery status transfer command included in the message, and to control the connector to transmit the data including the battery health information to the external electronic device through the initially activated channel.

According to various example embodiments as described above, an electronic device (for example, the electronic device 402) may include: a connector configured to be electrically connected with an external electronic device; a communication module comprising communication circuitry configured to communicate with another external electronic device; a memory configured to store instructions; and a processor configured to execute the stored instructions. The processor may be configured to control the electronic device to: based on an event being received from the another external electronic device, control the connector to supply a power to the external electronic device; and based on the power being supplied to the external electronic device, to generate a control signal to be transmitted through a channel initially activated based on the external electronic device being electrically connected to the connector from among a plurality of channels. The connector may be configured to transmit the generated control signal to the external electronic device, such that the external electronic device performs control based on a message included in the generated control signal.

In various example embodiments, the processor may be configured to control the electronic device to generate the control signal, such that the message included in the generated control signal includes a command corresponding to the event received from the another external electronic device.

In various example embodiments, the command corresponding to the event received from the another external electronic device may be a start up command, and the external electronic device may be configured to drive an operating system based on the start up command included in the message.

In various example embodiments, based on the operating system being driven in the external electronic device, the processor may be configured to control the electronic device to generate another control signal to be transmitted through the initially activated channel, based on a response to at least one control signal among a plurality of control signals transmitted to the external electronic device through the initially activated channel, not being received from the external electronic device. A message included in the another control signal may include a reboot command, and the external electronic device may be configured to drive the operating system again based on the reboot command included in the message included in the another control signal.

According to various example embodiments, the command corresponding to the event received from the another external electronic device may be a start up command, and the external electronic device may be configured to drive the operating system based on the start up command included in the message.

In various example embodiments, based on the operating system being driven in the external electronic device, the processor may be configured to control the electronic device to generate another control signal to be transmitted through the initially activated channel, based on a response to at least one control signal among a plurality of control signals transmitted to the external electronic device through the initially activated channel, not being received from the external electronic device. A message included in the another control signal may include a reboot command, and the external electronic device may be configured to drive the operating system again based on the reboot command included in the message included in the another control signal.

In various example embodiments, the processor may be configured to control the electronic device to generate another control signal to be transmitted to the external electronic device through the initially activated channel, based on another event received from the another external electronic device, and the external electronic device may be configured to shut down the operating system based on a shut down command corresponding to the another event and included in a message of the another control signal.

In various example embodiments, the processor may be configured to control the electronic device to: based on the power being supplied to the external electronic device, generate another control signal to be transmitted through the initially activated channel, a message of the another control signal including a battery status transfer command regarding a battery of the external electronic device; and to control power supply to the external electronic device, based on battery health information of data received from the external electronic device, in response to the another control signal.

In various example embodiments, the event may include an open event of a door of a car detected by the another external electronic device.

According to various example embodiments as described above, method of operating an electronic device (for example, the electronic device 401) may include: identifying a control signal received through a channel that is initially activated after an external electronic device is connected to a connector among a plurality of channels; and controlling based on a message included in the identified control signal.

In various example embodiments, the method may further include: based on the electronic device being identified by the external electronic device through the connector, receiving a power supplied by the external electronic device through the connector; and, based on the power supplied by the external electronic device being received, driving an operating system in a power off state.

In various example embodiments, the message included in the identified control signal may include a start up command, and controlling based on the message included in the identified control signal may include driving an operating system based on the start up command included in the message.

In various example embodiments, the method may include: identifying another control signal from the external electronic device received through the initially activated channel based on the operating system being driven; and controlling based on a message included in the identified another control signal.

In various example embodiments, the message included in the identified control signal may include a battery status transfer command, and controlling based on the message included in the identified control signal may include: generating data including battery health information of the battery based on the battery status transfer command included in the message; and controlling the connector to transmit the data including the battery health information to the external electronic device through the initially activated channel.

As described above, the electronic device 401 according to various example embodiments receives a control signal from the external electronic device even before an enumeration operation is completed, such that the electronic device 410 can operate more rapidly. In addition, as described above, the electronic device 401 according to various example embodiments receives a control signal from the external electronic device through an initially activated channel, and thus reboots the operating system through the control signal even when at least one of the operating system, an application or a combination thereof is in a disabled state, such that reliable operations can be guaranteed.

The electronic device and the method thereof according to various example embodiments can receive a control signal from the external electronic device even before an enumeration operation is completed.

The effects achieved by the disclosure are not limited to those mentioned above, and other effects that are not mentioned above may be clearly understood to those skilled in the art based on the description provided above.

Methods according to embodiments stated in claims and/or descriptions of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described example embodiments of the present disclosure, a component included in the present disclosure is expressed in the singular or the plural according to a presented example embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been illustrated and described with reference to various example embodiments thereof, it will be understood by those skilled in the art that various changes in form and details may be made therein without departing from the scope of the present disclosure.

What is claimed is:

1. An electronic device comprising:
   a connector configured to be connected with an external electronic device;
   a memory configured to store instructions; and
   a processor configured to execute the stored instructions,
   wherein the processor is configured to control the electronic device to:
      identify a control signal received through a channel initially activated based on the external electronic device being connected to the connector from among a plurality of channels,
      control the electronic device based on a message included in the identified control signal, wherein the message included in the identified control signal comprises a start up command, and
      control the electronic device to drive a first operating system based on the start up command included in the message.

2. The electronic device of claim 1, wherein, based on a power being supplied from the external electronic device through the connector, the processor is configured to control the electronic device to drive a first second operating system in a power off state.

3. The electronic device of claim 1, wherein the processor is configured to control the electronic device to:
   identify another control signal received through the initially activated channel based on the first second operating system being driven, and
   perform control of the electronic device based on a message included in the identified another control signal.

4. The electronic device of claim 3, wherein the identified another control signal is generated from the external electronic device based on a response to at least one control signal among a plurality of control signals transmitted by the external electronic device based on the first operating system being driven not being received from the electronic device,
   wherein the message included in the identified another control signal comprises a reboot command, and
   wherein the processor is configured to control the electronic device to drive the first operating system again based on the reboot command included in the message of the identified another control signal.

5. The electronic device of claim 3, wherein the identified another control signal is generated from the external electronic device based on an event that the external electronic device receives from another external electronic device,
   wherein a message included in the identified another control signal comprises a shut down command, and
   wherein the processor is configured to control the electronic device to shut down the first operating system based on the shut down command included in the message of the identified another control signal.

6. The electronic device of claim 5, wherein the event includes an open event of a door of a car detected by the another external electronic device.

7. The electronic device of claim 1, further comprising a battery configured to supply a power to the electronic device,
wherein the message included in the identified control signal comprises a battery status transfer command,
wherein the processor is configured to control the electronic device to:
generate data comprising battery health information of the battery based on the battery status transfer command included in the message, and
control the connector to transmit the data comprising the battery health information to the external electronic device through the initially activated channel.

8. An electronic device comprising:
a connector configured to be electrically connected with an external electronic device;
a communication module comprising communication circuitry configured to communicate with another external electronic device;
a memory configured to store instructions; and
a processor configured to execute the stored instructions,
wherein the processor is configured to control the electronic device to:
control the connector to supply a power to the external electronic device based on an event being received from the another external electronic device; and
generate a control signal to be transmitted through a channel initially activated based on the external electronic device being electrically connected to the connector from among a plurality of channels, based on the power being supplied to the external electronic device,
wherein the connector is configured to transmit the generated control signal to the external electronic device, such that the external electronic device performs control of the external electronic device based on a message included in the generated control signal,
wherein the processor is configured to control the electronic device to generate the control signal, such that the message included in the generated control signal comprises a command corresponding to the event received from the another external electronic device,
wherein the command corresponding to the event received from the another external electronic device includes a start up command, and
wherein the external electronic device is configured to drive an operating system based on the start up command included in the message.

9. The electronic device of claim 8, wherein, based on the operating system being driven in the external electronic device, the processor is configured to control the electronic device generate another control signal to be transmitted through the initially activated channel, based on a response to at least one control signal among a plurality of control signals transmitted to the external electronic device through the initially activated channel, not being received from the external electronic device,
wherein a message included in the another control signal comprises a reboot command, and
wherein the external electronic device is configured to drive the operating system again based on the reboot command included in the message included in the another control signal.

10. The electronic device of claim 8, wherein the processor is configured to control the electronic device to generate another control signal to be transmitted to the external electronic device through the initially activated channel, based on another event received from the another external electronic device, and
wherein the external electronic device is configured to shut down the operating system based on a shut down command corresponding to the another event included in a message of the another control signal.

11. The electronic device of claim 8, wherein the processor is configured to control the electronic device to:
generate another control signal to be transmitted through the initially activated channel based on the power being supplied to the external electronic device, a message of the another control signal comprising a battery status transfer command regarding a battery of the external electronic device; and
control power supply to the external electronic device, based on battery health information of data received from the external electronic device, in response to the another control signal.

12. The electronic device of claim 8, wherein the event includes an open event of a door of a car detected by the another external electronic device.

13. A method of operating an electronic device, the method comprising:
identifying a control signal received through a channel initially activated based on an external electronic device being connected to a connector from among a plurality of channels; and
controlling the electronic device based on a message included in the identified control signal,
wherein the message included in the identified control signal comprises a start up command,
wherein controlling the electronic device based on the message included in the identified control signal comprises driving an operating system based on the start up command included in the message.

14. The method of claim 13, further comprising:
receiving a power supplied by the external electronic device through the connector based on the electronic device being identified by the external electronic device through the connector; and
driving the operating system in a power off state based on the power supplied by the external electronic device being received.

15. The method of claim 13, comprising:
identifying another control signal from the external electronic device received through the initially activated channel based on the operating system being driven; and
controlling based on a message included in the identified another control signal.

16. The method of claim 13, wherein the message included in the identified control signal comprises a battery status transfer command, and
wherein controlling based on the message included in the identified control signal comprises:
generating data comprising battery health information of the battery based on the battery status transfer command included in the message; and
controlling the connector to transmit the data comprising the battery health information to the external electronic device through the initially activated channel.

* * * * *